(12) United States Patent
Miyazawa et al.

(10) Patent No.: US 10,324,544 B2
(45) Date of Patent: Jun. 18, 2019

(54) HAND-WRITTEN INFORMATION PROCESS APPARATUS, HAND-WRITTEN INFORMATION PROCESSING METHOD AND HAND-WRITTEN INFORMATION PROCESSING PROGRAM

(71) Applicant: Wacom Co., Ltd., Saitama (JP)

(72) Inventors: Yukio Miyazawa, Saitama (JP);
Hiroshi Fujioka, Saitama (JP); Giles Thomas Mitchell, Tokyo (JP); Konrad Pollmann, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/391,451

(22) Filed: Dec. 27, 2016

(65) Prior Publication Data
US 2018/0181212 A1    Jun. 28, 2018

(51) Int. Cl.
*G06F 3/038* (2013.01)
*G06F 3/044* (2006.01)
(Continued)

(52) U.S. Cl.
CPC .......... *G06F 3/038* (2013.01); *G06F 3/03545* (2013.01); *G06F 3/03547* (2013.01);
(Continued)

(58) Field of Classification Search
CPC .... G06F 3/038; G06F 3/03545; G06F 3/0416; G06F 3/044; G06F 3/046; G06F 2203/04106
See application file for complete search history.

(56) References Cited

U.S. PATENT DOCUMENTS 5,194,852 A * 3/1993 More ................. G06F 3/04883
178/18.03
5,396,443 A * 3/1995 Mese ................... G06F 1/3215
713/321
(Continued)

FOREIGN PATENT DOCUMENTS

JP    2003022158 A    1/2003
JP    5137150 B1    2/2013

OTHER PUBLICATIONS

Extended European Search Report, dated Apr. 11, 2018, for European Application No. 17209842.8-1216, 10 pages.

*Primary Examiner* — Md Saiful A Siddiqui
(74) *Attorney, Agent, or Firm* — Seed IP Law Group LLP

(57) ABSTRACT

A hand-written information processing apparatus is provided by which such correction as to directly deal with a design drawn on a paper sheet or the like can be performed. The hand-written information processing apparatus includes a stylus detection sensor, a connection interface for outputting writing information corresponding to a writing operation of a stylus to an external apparatus which includes a display screen for displaying an image, and a display image processing information generation circuit for generating display image processing information for performing a given image operation process based on an operation input accepted by an operation input acceptance unit to the display image. An inputting face is configured such that a sheet member on which writing corresponding to a writing operation of a stylus can be visually formed can be placed thereon. In addition to a normal stylus, an ink stylus which can form a writing trace visually on a sheet member can be utilized. The hand-written information processing apparatus has a first mode for the normal stylus and a second mode for retaining writing information by the ink stylus into a memory.

19 Claims, 18 Drawing Sheets

(51) Int. Cl.
    *G06F 3/046*         (2006.01)
    *G06F 3/0354*      (2013.01)
    *G06F 3/041*         (2006.01)
    *G06F 3/0488*      (2013.01)

(52) U.S. Cl.
    CPC .............. *G06F 3/044* (2013.01); *G06F 3/046* (2013.01); *G06F 3/0416* (2013.01); *G06F 3/04883* (2013.01); *G06F 2203/04106* (2013.01)

(56) References Cited

U.S. PATENT DOCUMENTS

| | | | | |
|---|---|---|---|---|
| 5,612,720 | A * | 3/1997 | Ito | G06F 3/03545 178/19.01 |
| 6,462,733 | B1 * | 10/2002 | Murakami | G06F 3/033 345/156 |
| 8,970,540 | B1 * | 3/2015 | Hebenstreit | G06F 17/241 178/18.01 |
| 2002/0040817 | A1 * | 4/2002 | LeKuch | G06F 1/1616 178/18.09 |
| 2002/0163511 | A1 * | 11/2002 | Sekendur | G06F 3/0321 345/179 |
| 2004/0036681 | A1 * | 2/2004 | Kluttz | G06F 3/041 345/173 |
| 2005/0057534 | A1 * | 3/2005 | Charlier | G06F 3/0312 345/179 |
| 2008/0150917 | A1 * | 6/2008 | Libbey | G06F 3/03545 345/179 |
| 2012/0299881 | A1 | 11/2012 | De Muelenaere et al. | |
| 2014/0125606 | A1 * | 5/2014 | Namkung | G06F 1/1656 345/173 |
| 2015/0258841 | A1 * | 9/2015 | Briganti | B42F 9/002 24/67.3 |

\* cited by examiner

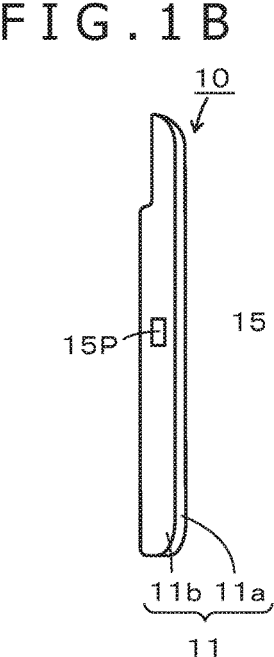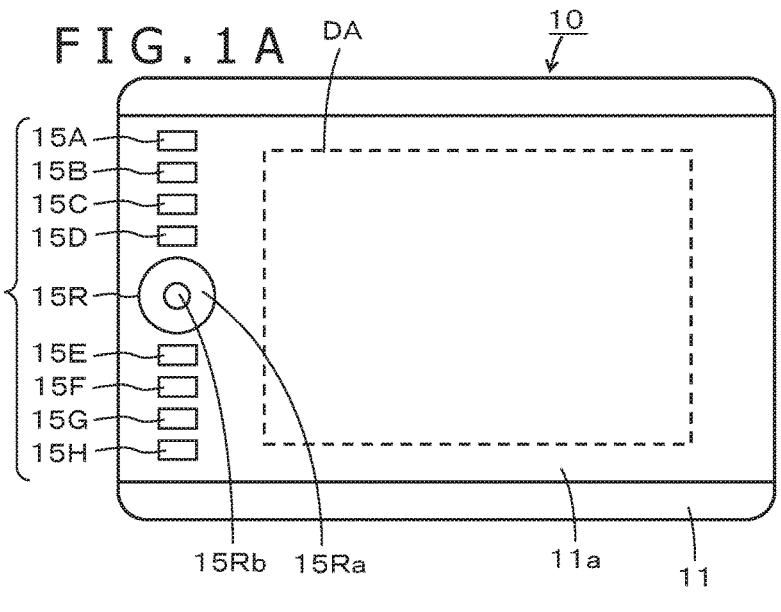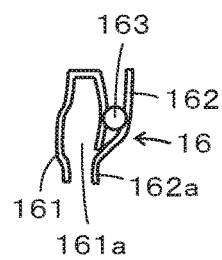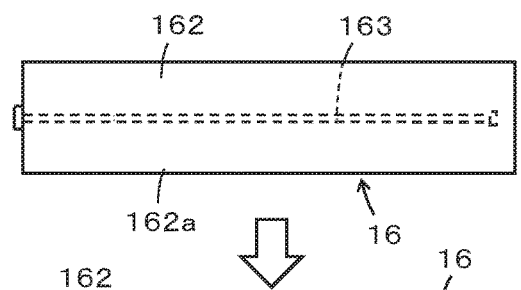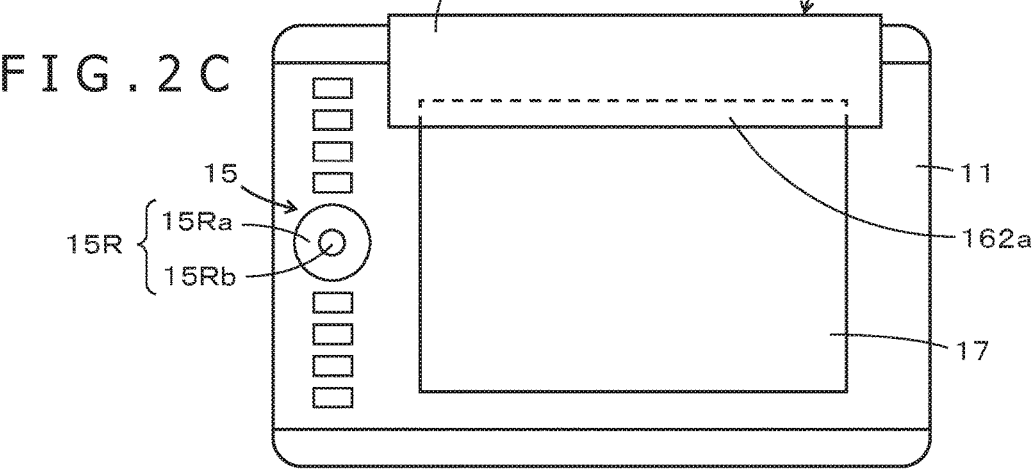

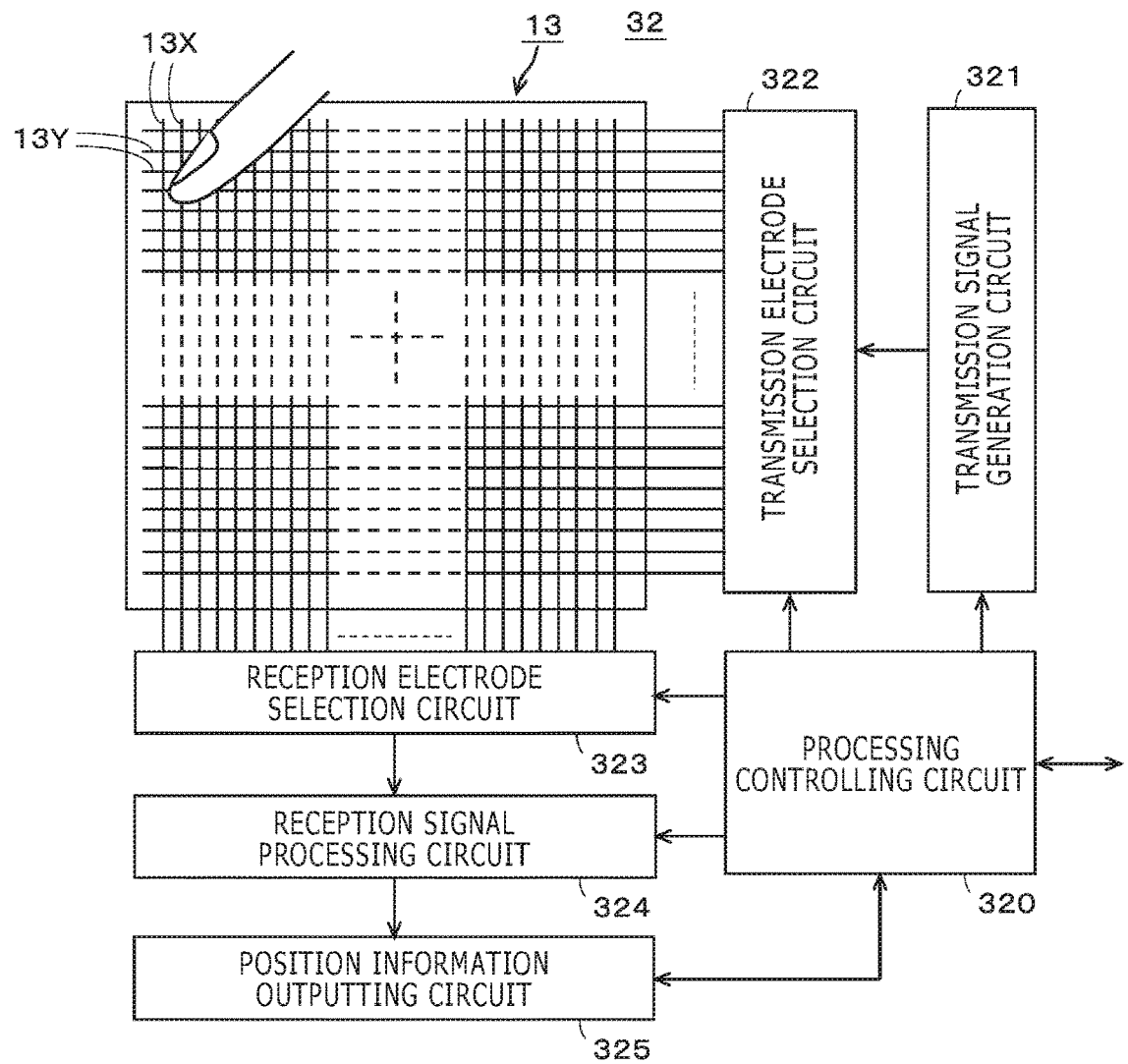

FIG.18
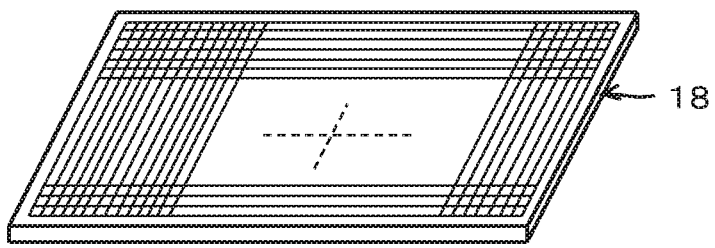
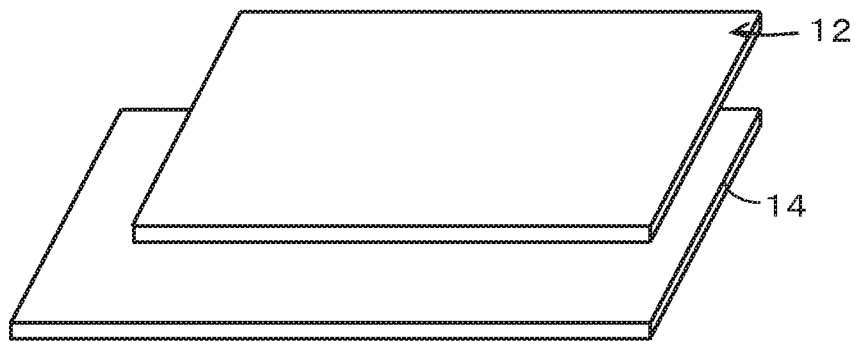

HAND-WRITTEN INFORMATION PROCESS APPARATUS, HAND-WRITTEN INFORMATION PROCESSING METHOD AND HAND-WRITTEN INFORMATION PROCESSING PROGRAM

BACKGROUND OF THE INVENTION

Field of the Invention

The present invention relates to a hand-written information processing apparatus, a hand-written information processing method and a hand-written information processing program.

Description of the Related Art

A hand-written information processing apparatus called, for example, digitizer or tablet apparatus is known. For example, as disclosed in Patent Document 1 (Japanese Patent No. 5137150), the hand-written information processing apparatus is an information processing apparatus including a display screen, a coordinate inputting apparatus connected to and used together with, for example, a display apparatus or a coordinate inputting apparatus connected to and used together with a computer including a display apparatus.

The hand-written information processing apparatus is used together with a position indicator in the form of a pen (hereinafter referred to as stylus). If indication inputting (writing operation) by a stylus is performed on a position detection face (hereinafter referred to as inputting face) for detecting two-dimensional position information, then the writing operation is detected through an interaction with a stylus detection sensor and the position coordinate is supplied as writing information to the information processing apparatus. The information processing apparatus generates display image information corresponding to the hand writing input by the stylus from the position coordinate (writing information) based on the indication inputting by the indication member, the position coordinate being received from hand-written information processing apparatus, and displays the display image information on the screen of a display apparatus.

Some hand-written information processing apparatus of the type described above includes various processing functions for moving, rotating, enlarging/reducing or scrolling an image generated by a hand writing input and displayed on the screen of the display apparatus or by changing a display color of a rendered image. The user can perform a writing operation with the stylus while utilizing the processing functions described above to render a fine drawing, an animation image or the like while confirming a display image displayed on the display screen.

SUMMARY OF THE INVENTION

Incidentally, before an image is produced using a hand-written information processing apparatus of the type described above, the user often draws a design in advance on a paper sheet and then executes production of an image using a hand-written information processing apparatus on the basis of the design. Especially, when it is tried to draw a picture based on a sketch drawn outdoors or on the go, creation of a design is performed normally.

In such a case as just described, even if a design drawn on a paper sheet is fetched by a scanner to generate electronic data, the electronic data is different from electronic data handled by the hand-written information processing apparatus. Therefore, correction for directly modifying the design or the like cannot be performed. Therefore, it is necessary for the user to perform such a work that a rendered image drawn on a paper sheet is traced by a stylus or the like, and a great number of man hours are demanded for a hand-written information processing work.

It is an object of the present invention to provide a hand-written information processing apparatus which can solve such problems as described above.

In order to solve the subject described above, in the invention according to claim 1, there is provided a hand-written information processing apparatus which includes a stylus detection sensor configured to detect a writing operation of a stylus on an inputting face, a connection interface configured to output writing information corresponding to a writing operation of the stylus detected by an interaction with the stylus detection sensor to an external apparatus which includes a display screen, an operation input acceptance unit configured to accept an operation input by a user, a display image processing information generation circuit configured to generate display image processing information, which is to be applied when the writing information is displayed on the display screen, in response to the operation input accepted by the operation input acceptance unit, and a memory, and which is configured such that a sheet member on which writing corresponding to a writing operation of a stylus can be formed visually can be placed on the inputting face, wherein a first stylus whose writing operation on the inputting face is detected by an interaction with the stylus detection sensor and a second stylus whose writing operation on the inputting face is detected by an interaction with the stylus detection sensor and, different from the first stylus, whose writing corresponding to the writing operation on the inputting face can be formed visually on the sheet member can be utilized;

the hand-written information processing apparatus further includes a stylus recognition circuit for recognizing whether a writing operation on the inputting face is a writing operation by the first stylus or a writing operation by the second stylus; and the hand-written information processing apparatus further includes a first mode in which, when a writing operation on the inputting face by the first stylus is recognized by the stylus recognition circuit, writing information corresponding to the writing operation on the inputting face by the first stylus detected by the interaction with the stylus detection sensor and the display image processing information generated by the display image processing information generation circuit can be outputted to the external apparatus through the connection interface; and a second mode in which, when a writing operation on the inputting face by the second stylus is recognized by the stylus recognition circuit, writing information corresponding to the writing operation on the inputting face by the second stylus detected by the interaction with the stylus detection sensor is retained into the memory and application of the display image processing information generated by the display image processing information generation circuit to the writing information retained in the memory is limited.

With the hand-written information processing apparatus according to the present invention, a hand-written information process can be performed using writing information generated electrically corresponding to writing information by writing formed visually on a sheet member such as a paper sheet. Further, since the hand-written information processing apparatus is configured such that display image processing information for performing a given image operation process for a display image of the writing information by the writing formed visually on the sheet member is not applied to the memory, a figure based on the writing information by the writing formed visually on the sheet member such as a paper sheet and another figure based on electronic writing information generated corresponding to the writing information by the writing and retained in the memory have an image similarity therebetween into which an intentional image operation process does not enter. Therefore, the rendered image by writing formed visually on the sheet member by the second stylus and the display image formed from the writing information retained in the memory have a one-by-one corresponding relationship, and the user can perform a hand-written information process using the rendered image written on the sheet member as a design.

BRIEF DESCRIPTION OF THE DRAWINGS

FIGS. 1A and 1B each is a view depicting an outline of an embodiment of a hand-written information processing apparatus according to the present invention.

FIGS. 2A-2C each is a view depicting an outline of the embodiment of the hand-written information processing apparatus according to the present invention.

FIG. 6 is a view depicting an example of a configuration of different part of the electronic circuit in the embodiment of the hand-written information processing apparatus according to the present invention.

FIGS. 7A and 7B each is a view illustrating an output signal format of the embodiment of the hand-written information processing apparatus according to the present invention.

FIG. 18 is a view illustrating an example of an internal configuration of the different embodiment of the hand-written information processing apparatus according to the present invention.

DETAILED DESCRIPTION

In the following, embodiments of the hand-written information processing apparatus according to the present invention are described with reference to the drawings.

FIG. 1 is a view illustrating an appearance of a hand-written information processing apparatus 10 of the present embodiment, and FIG. 1A is a front elevational view and FIG. 1B is a left side elevational view of the hand-written information processing apparatus 10. As recognized from FIG. 1, the hand-written information processing apparatus 10 has a configuration of a thin plate-shaped tablet. As depicted in FIG. 1B, a housing 11 of the hand-written information processing apparatus 10 is configured such that it includes an upper side case 11a and a lower side case 11b and the upper side case 11a is fitted with the lower side case 11b in such a state that the upper side case 11a covers an internal space of the lower side case 11b.

Figure 3:
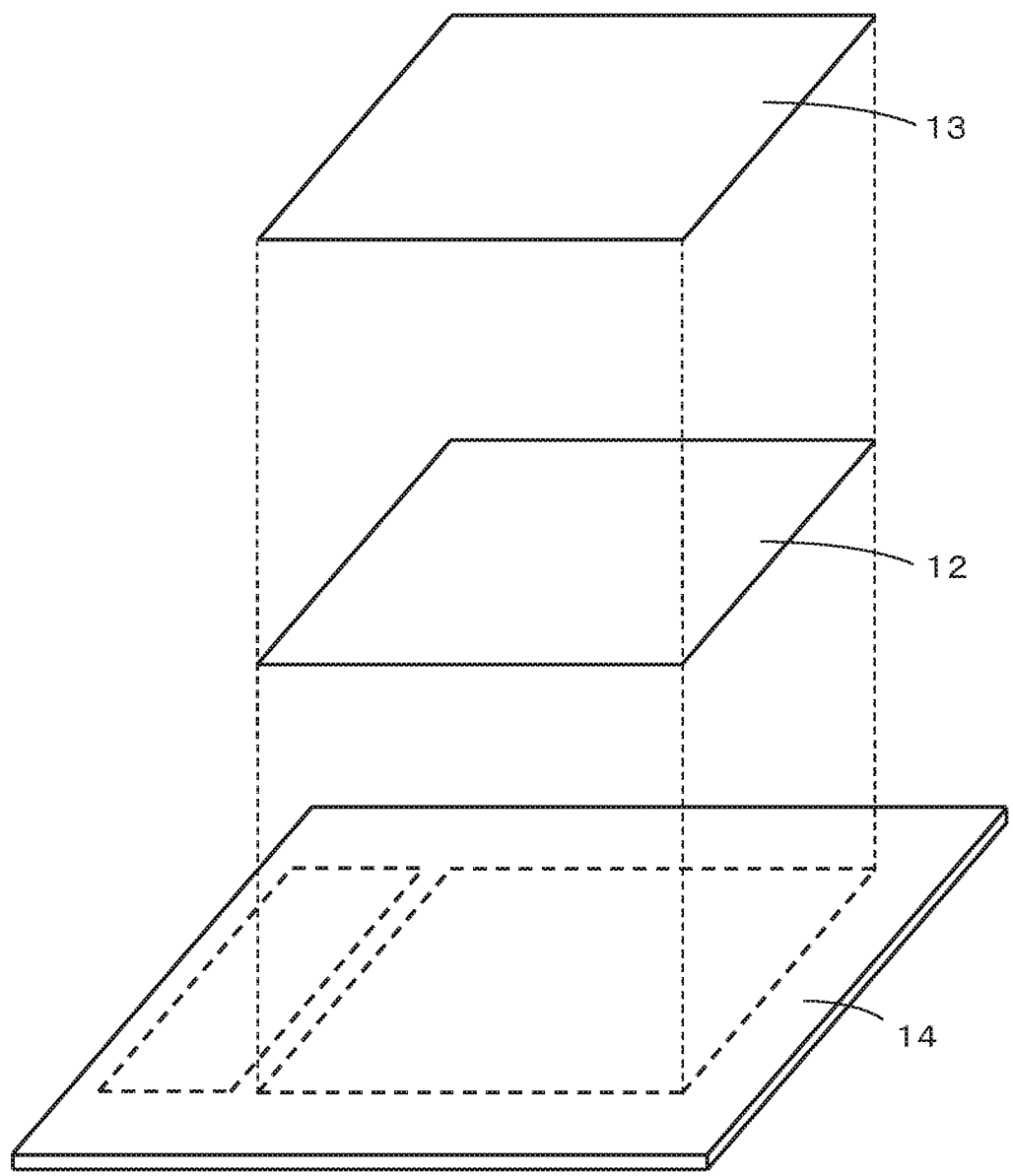
FIG. 3 is a view depicting an outline of the embodiment of the hand-written information processing apparatus according to the present invention.

In the present embodiment, as depicted in FIG. 3, a stylus detection sensor 12, a touch detection sensor 13, a circuit board 14 and an operation button group 15 (refer to FIG. 1) whose illustration is omitted in FIG. 3 are accommodated in the internal space of the lower side case 11b. In this example, the stylus detection sensor 12 is configured from a sensor of the electromagnetic induction type. In this example, the touch detection sensor 13 is configured from a sensor of the capacitance type. It is to be noted that the touch detection sensor 13 and the operation button group 15 configure an example of an operation input acceptance unit in the present embodiment.

In the present embodiment, as depicted in FIG. 3, the touch detection sensor 13, stylus detection sensor 12 and circuit board 14 are disposed in order in the housing 11 in such a state that they overlap with each other as viewed from the upper side case 11a side. In this case, the stylus detection sensor 12 and the touch detection sensor 13 are accommodated in such a state that detection regions of the sensors overlap with each other as viewed from a direction orthogonal to the surface of the upper side case 11a.

The stylus detection sensor 12 can detect a stylus through the upper side case 11a, and the touch detection sensor 13 can detect a finger touch through the upper side case 11a. The surface of the upper side case 11a functions as a common inputting face to the stylus detection sensor 12 and the touch detection sensor 13. A region of the surface of the upper side case 11a surrounded by a broken line in FIG. 1A serves as a common detection region DA which is common to the stylus detection sensor 12 and the touch detection sensor 13.

In the present embodiment, as depicted in FIG. 1A, the operation button group 15 is provided at a left side portion of the housing 11. In this example, the operation button group 15 is configured from nine operation buttons such that operation portions 15A, 15B, . . . , 15H and 15R of the operation buttons are provided in an exposed relationship to the outside at a side portion of the upper side case 11a of the detection region DA of the stylus detection sensor 12 and the touch detection sensor 13 such that the user can operate them. In the present example, each of the operation portions 15A to 15H has a square shape and the operation portion 15R has a circular shape. Perforations (not depicted) through which the operation portions 15A, 15B, . . . , 15H and 15R of the operation buttons are exposed are formed in the upper side case 11a.

In the present embodiment, the nine operation buttons are configured such that, if the user touches the operation portions 15A to 15H and 15R by a finger, then the touch can be detected by a capacitance method. Further, each of the operation portions 15A to 15H and 15R is configured such that, if the user pushes its operation portion by a finger, then, by a deviation of the hand-written information processing apparatus 10 deflected in a direction toward the inside of the housing 11, a push switch provided in the housing 11 can be operated for depression to perform a switching operation of the push switch.

A touch operation or a depression operation of each of the operation portions 15A to 15H and 15R of the operation buttons of the operation button group 15 is allocated in the hand-written information processing apparatus 10 to such a function as setting menu display, changeover between various modes, instruction to return by one, enlargement, reduction, movement, rotation and scroll of a character or a picture of a display image based on writing information on the display screen of the display apparatus and so forth. The user can perform an inputting operation to the detection region DA by a stylus while operating the operation portions 15A to 15H and 15R by one hand.

It is to be noted that the operation portion 15R includes two kinds of operation portions, and one the two operation portions is a ring-shaped wheel operation portion 15Ra and the other one of the two operation portions is a depression operation portion 15Rb provided at the center of the wheel operation portion 15Ra. The wheel operation portion 15Ra is configured so as to allow tracing operation inputting and is configured, for example, such that the wheel operation portion 15Ra can be used to input an instruction for rotation or the like of a display image based on writing information.

It is to be noted that, in the present embodiment, as hereinafter described, when it is tried to perform writing by an ink stylus, by which visible writing is to be performed, on a paper sheet 17 which is fixed in position on the inputting face of the hand-written information processing apparatus 10 by a clip member 16, finger touch detection by the touch detection sensor 13 is stopped and an operation of an operation button in the operation button group 15 for performing an image operation process such as to change a display image of writing information is invalid. However, exchange of the paper sheet 17, namely, a page feeding operation, and a changeover operation between a standard paper mode and a live paper mode of a paper mode hereinafter described, are valid. In this example, the page feeding operation is performed by the depression operation portion 15Ra of the operation portion 15R.

Figure 5:
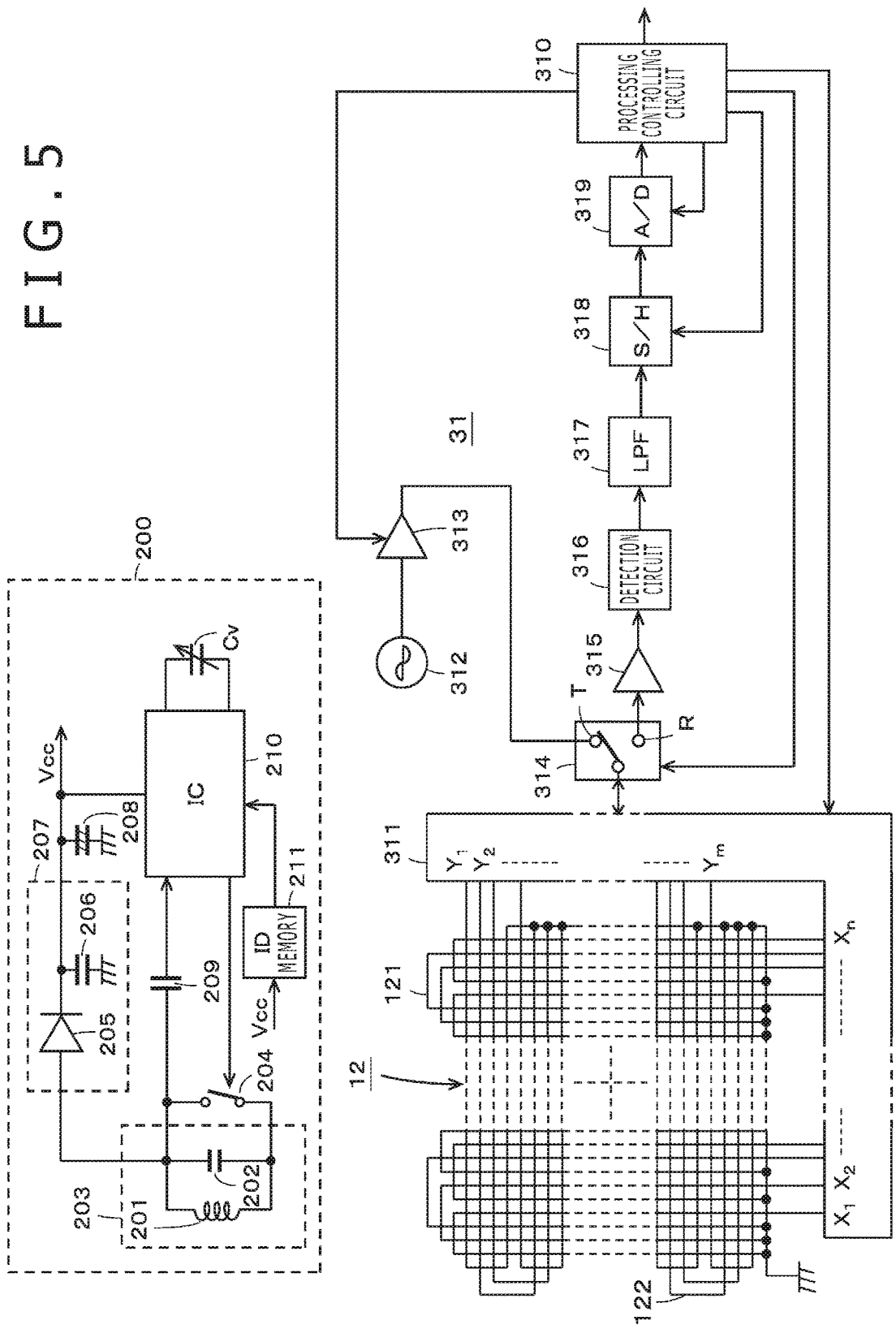
FIG. 5 is a view depicting an example of a configuration of part of the electronic circuit in the embodiment of the hand-written information processing apparatus according to the present invention.

As depicted in FIG. 5 hereinafter described, a stylus position detection circuit 31 for the stylus detection sensor 12, a touch position detection circuit 32 for the touch detection sensor 13 and an operation input interface (interface is described as I/F in the drawings) 33 which configures an operation input acceptance unit for the operation button group 15 are disposed on the circuit board 14, and a USB interface 34 and a wireless communication circuit 35 for the connection between the hand-written information processing apparatus 10 and an external apparatus, a memory 36, a control circuit 100 for controlling the entire apparatus are disposed on the circuit board 14.

For the hand-written information processing apparatus 10 of the present embodiment, two kinds of styluses including a first stylus and a second stylus are prepared as styluses whose indication position input can be detected by the stylus detection sensor 12. In this example, the first stylus is a stylus of a normal electromagnetic induction type (hereinafter referred to as normal stylus) and the second stylus is a stylus of an electromagnetic induction type (hereinafter referred to as ink stylus) whose core member has a ballpoint pen function or a function of a mechanical pencil and by which a writing trace can be visibly formed on a sheet member such as a paper sheet.

Accordingly, in the hand-written information processing apparatus 10 of the present embodiment, if a paper sheet which is an example of a sheet member is placed in the detection region DA of the inputting face which is the surface of the upper side case 11a and a writing operation is performed for the detection region DA of the inputting face by an ink stylus, then the writing trace can be formed visually on a paper sheet and writing information corresponding to the writing trace can be detected and acquired by the stylus detection sensor 12.

In this case, if the paper sheet placed on the inputting face moves on the inputting face, then the writing trace formed on the paper sheet and the writing information corresponding to the writing trace are displaced out of a one-by-one corresponding relationship. Therefore, in the hand-written information processing apparatus 10 of the present embodiment, the clip member 16 is removably attached to the housing 11 so as to allow the paper sheet to be elastically fixed to the inputting face.

FIG. 2 is a view depicting an example of a configuration of the clip member 16. In particular, FIG. 2A is a front elevational view of the clip member 16, and FIG. 2B is a left side elevational view of the clip member 16. Further, FIG. 2C illustrates a state in which the clip member 16 is attached to the housing 11 of the hand-written information processing apparatus 10 and elastically fixes a paper sheet 17.

As depicted in FIG. 2A, the clip member 16 of the present example is configured from an attaching portion 161 having a U-shaped cross section and having a recessed portion 161a, and a holding down piece 162 attached to the attaching portion 161 for pivotal motion around a pivot shaft 163. Though not depicted, a coil spring is wound around the pivot shaft 163 such that an end portion 162a of the holding down piece 162 on the opening side of the recessed portion 161a of the attaching portion 161 is normally displaced elastically to the attaching portion 161 side by the coil spring.

The attaching portion 161 of the clip member 16 is configured from a material having elasticity, for example, from a resin, and the recessed portion 161a is formed in accordance with a shape and a size of an stepped portion of the housing 11. The clip member 16 is attached to an stepped portion of the housing 11 of the hand-written information processing apparatus 10 such that an stepped portion of the housing 11 of the hand-written information processing apparatus 10 is accommodated in the recessed portion 161a of the attaching portion 161. The width of the recessed portion 161a of the attaching portion 161 of the clip member 16 is formed a little smaller than the thickness of an stepped portion of the housing 11, and the clip member 16 is locked (fixed) to an stepped portion of the housing 11 of the hand-written information processing apparatus 10 in such a manner that the clip member 16 holds the stepped portion of the housing 11 in the recessed portion 161a by elastic force of the attaching portion 161. However, the clip member 16 can be removed from the hand-written information processing apparatus 10 by removing the attaching portion 161 thereof from the stepped portion of the housing 11.

As depicted in FIG. 2C, in a state in which the clip member 16 is fixed to the stepped portion of the housing 11 of the hand-written information processing apparatus 10, the end portion 162a of the holding down piece 162 of the clip member 16 is in a state in which it elastically presses the surface of the upper side case 11a of the housing 11. If, in this state, the opposite side of the holding down piece 162 to the end portion 162a is depressed, then the holding down piece 162 is pivoted around the pivot shaft 163 to form a gap between the end portion 162a and the surface of the upper side case 11a of the housing 11. However, if the depression of the opposite side of the holding down piece 162 to the end portion 162a is cancelled, then the end portion 162a of the holding down piece 162 returns to the state in which it elastically presses the surface of the upper side case 11a of the housing 11.

Accordingly, if, in the state in which the clip member 16 is attached to the housing 11 as depicted in FIG. 2C, the opposite side of the holding down piece 162 to the end portion 162a is depressed to form a gap between the end portion 162a of the holding down piece 162 and the surface of the upper side case 11a of the housing 11 and an upper end of the paper sheet 17 is placed into the gap and then the depression of the opposite side of the holding down piece 162 to the end portion 162a is cancelled, then the paper sheet 17 is elastically sandwiched between the end portion 162a of the holding down piece 162 and the surface of the upper side case 11a of the housing 11 to fix the paper sheet 17 in position against movement. In this case, one or a plurality of paper sheets 17 may be fixed in position by the clip member 16.

Figure 4:
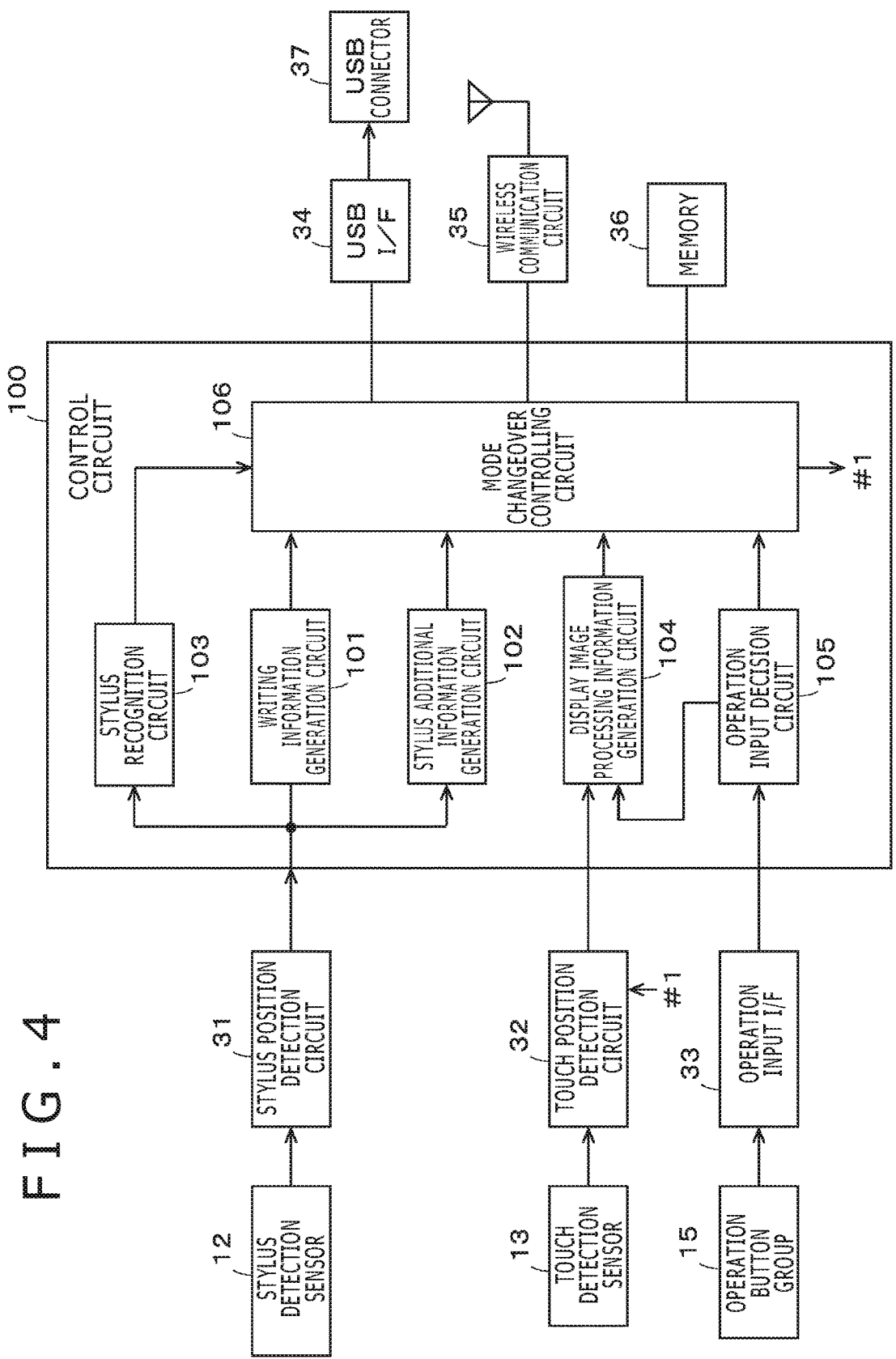
FIG. 4 is a block diagram of an example of a configuration of an electronic circuit in the embodiment of the hand-written information processing apparatus according to the present invention.

Example of Configuration of Electronic Circuit of Hand-Written Information Processing Apparatus of This Embodiment FIG. 4 is a block diagram depicting an example of a configuration of an electronic circuit of the hand-written information processing apparatus 10 of the present embodiment. In this example, the electronic circuit of the hand-written information processing apparatus 10 of the present embodiment includes a control circuit 100 configured including a computer. Further, as circuits on the input side to the control circuit 100, a position detection circuit (hereinafter referred to as stylus position detection circuit) 31 for the stylus detection sensor 12, a position detection circuit (hereinafter referred to as touch position detection circuit) 32 for the touch detection sensor 13 and an operation input interface 33 are connected. Meanwhile, as circuits on the output side of the control circuit 100, the USB interface 34, the wireless communication circuit 35 and the memory 36 are connected.

The stylus detection sensor 12 is connected to the stylus position detection circuit 31. The stylus detection sensor 12 is a stylus detection sensor of the electromagnetic induction type. In the present example, the stylus detection sensor 12 detects, through an interaction by electromagnetic coupling with a normal stylus as a first stylus or an ink stylus as a second stylus, an indication position by the stylus and outputs a result of the detection to the stylus position detection circuit 31. The stylus position detection circuit 31 detects a coordinate of the indication position in the detection region DA by the normal stylus or the ink stylus from an output of the stylus detection sensor 12.

Further, each of the normal stylus and the ink stylus in the present embodiment includes a writing pressure detection unit for detecting a writing pressure applied to the core member and a storage unit for pen identification information (hereinafter referred to as stylus ID) of the stylus, and sends out stylus additional information including the detected writing pressure information and the stored pen identification information to the stylus detection sensor 12. The stylus position detection circuit 31 has a function for extracting writing pressure information or a stylus ID from the detected stylus additional information. The stylus position detection circuit 31 supplies coordinate information of the detected indication position and the stylus additional information to the control circuit 100.

The control circuit 100 generates writing information to be outputted from the received coordinate information of the indication position and generates stylus additional information to be outputted from the received stylus additional information as hereinafter described. Further, the control circuit 100 decides a stylus ID included in the received stylus additional information and recognizes whether the stylus detected by the stylus detection sensor 12 is the normal stylus or the ink stylus, and then performs mode changeover as hereinafter described in response to a result of the recognition.

Example of Circuit Configuration of Stylus Position Detection Circuit 31

FIG. 5 is a view depicting an example of a circuit configuration of the stylus detection sensor 12 and the stylus position detection circuit 31 together with an example of a circuit configuration of the normal stylus or the ink stylus. It is to be noted that the normal stylus and the ink stylus have, as an electronic circuit for instruction though electromagnetic induction coupling with the stylus detection sensor 12, substantially similar circuit configurations. In FIG. 5, the common circuit configuration portion is indicated as a stylus circuit 200.

As depicted in FIG. 5, the stylus circuit 200 is configured such that it performs an interaction with the stylus detection sensor 12 through electromagnetic induction coupling with loop coil groups hereinafter described of the stylus detection sensor 12 to exchange a position detecting signal and transmit additional information such as writing pressure information or a stylus ID detected through a writing pressure detection unit to the stylus detection sensor 12.

As described hereinabove, in the normal stylus or the ink stylus, a capacitor 202 is connected in parallel to a coil 201 wound on a ferrite core to configure a parallel resonance circuit 203. A pen controlling circuit 210 controls the entire stylus circuit 200 as depicted in FIG. 5. In the present example, the pen controlling circuit 210 is configured from an IC.

Thus, an AC signal received through electromagnetic coupling from the stylus detection sensor 12 by the parallel resonance circuit 203 is supplied to the pen controlling circuit 210 through a capacitor 209 and is supplied to and rectified by a rectification circuit 207 configured from a diode 205 and a capacitor 206 for charging of a rectified voltage and then charged into a capacitor 208. Then, the rectified output voltage obtained across the capacitor 208 is supplied as a power supply voltage of the pen controlling circuit 210.

Further, a switch 204 is connected in parallel to the resonance circuit 203. The switch 204 is configured so as to be controlled between on and off by the pen controlling circuit 210. When the switch 204 is off, resonance action for a signal from the stylus detection sensor 12 by the parallel resonance circuit 203 is performed. However, when the switch 204 is on, the capacitor 202 connected in parallel to the coil 201 is short-circuited to turn off the resonance action for a signal from the stylus detection sensor 12 by the parallel resonance circuit 203.

Further, each of the normal stylus and the ink stylus used in the present embodiment includes, though not depicted, a writing pressure detection unit configured from a piezoelectric element which detects a writing pressure applied to the core member, for example, as a capacitance Cv of a variable capacitor. To the pen controlling circuit 210, a variable capacitor CV configured from the writing pressure detection unit is connected. The pen controlling circuit 210 measures the capacitance of the variable capacitor CV, detects a variation of the writing pressure from a variation of the measured capacitance of the variable capacitor CV and detects whether or not a writing pressure is applied to the core member of the stylus. Further, when it is detected that a writing pressure is applied, the pen controlling circuit 210 calculates the writing pressure value from the value of the capacitance of the variable capacitor CV.

Further, in the present embodiment, the pen controlling circuit 210 converts the calculated writing pressure value into writing pressure data of a digital signal and controls the switch 204 between on and off with the writing pressure data to transmit a digital signal of the writing pressure value of a plurality of bits as part of additional information formed from an ASK (Amplitude Shift Keying) signal or an OOK (On Off Keying) signal to the stylus detection sensor 12.

Further, in the present example, an ID memory 211 which stores a stylus ID is connected to the pen controlling circuit 210. The pen controlling circuit 210 controls the switch 204 between on and off in response to a stylus ID read out from the ID memory 211 to transmit the stylus ID as part of the additional information formed from an ASK signal or an OOK signal to the stylus detection sensor 12.

The stylus detection sensor 12 is formed, in the present example, from an X-axis direction loop coil group 121 and a Y-axis direction loop coil group 122 stacked with each other as depicted in FIG. 5. The loop coil groups 121 and 122 are configured, for example, from n and m rectangular loop coils, respectively. The loop coils configuring the loop coil groups 121 and 122 are disposed such that they are arranged at equal distances and successively overlapped with each other.

The stylus position detection circuit 31 includes a selection circuit 311 to which the X-axis direction loop coil group 121 and the Y-axis direction loop coil group 122 are connected. The selection circuit 311 successively selects one of the loop coils of the loop coil groups 121 and 122.

Furthermore, the stylus position detection circuit 31 includes an oscillation circuit 312, a current driver 313, a changeover connection circuit 314, a reception amplifier 315, a detection circuit 316, a low-pass filter 317, a sample and hold circuit 318, an A/D conversion circuit 319 and a processing controlling circuit 310. The processing controlling circuit 310 is configured, for example, from a microcomputer.

A frequency fo of an AC signal outputted from the oscillation circuit 312 is selected so as to be equal to the resonance frequency of the parallel resonance circuit 203 of the stylus circuit 200. The AC signal from the oscillation circuit 312 is supplied to the current driver 313. The current driver 313 converts the AC signal supplied thereto from the oscillation circuit 312 into electric current and sends out the electric current to the changeover connection circuit 314. The changeover connection circuit 314 changes over the connection destination (transmission side terminal T or reception side terminal R) to which a loop coil selected by the selection circuit 311 is to be connected under the control of the processing controlling circuit 310. Of the connection destinations, to the transmission side terminal T, the current driver 313 is connected, and to the reception side terminal R, the reception amplifier 315 is connected.

The current driver 313 is controlled by the processing controlling circuit 310. The processing controlling circuit 310 controls the current driver 313 to control supply of an oscillation signal of the frequency fo from the oscillation circuit 312 to the loop coil of the stylus detection sensor 12 to control signal transmission from the loop coil to the normal stylus or the ink stylus.

An induced voltage generated in the loop coil selected by the selection circuit 311 is sent to the reception amplifier 315 through the selection circuit 311 and the changeover connection circuit 314. The reception amplifier 315 amplifies and sends out the induced voltage supplied thereto from the loop coil to the detection circuit 316.

The detection circuit 316 detects the induced voltage generated in the loop coil, namely, the reception signal, and sends out the detected reception signal to the low-pass filter 317. The low-pass filter 317 has a cutoff frequency sufficiently lower than the frequency fo described above, and converts an output signal of the detection circuit 316 into a DC signal and sends out the DC signal to the sample and hold circuit 318. The sample and hold circuit 318 retains a voltage value at a predetermined timing of an output signal of the low-pass filter 317, in particular, at a predetermined timing within a reception period and sends out the voltage value to the A/D (Analog to Digital) conversion circuit 319. The A/D conversion circuit 319 converts an analog output of the sample and hold circuit 318 into a digital signal and outputs the digital signal to the processing controlling circuit 310.

The processing controlling circuit 310 controls selection of a loop coil by the selection circuit 311, changeover of the changeover connection circuit 314 and the timing of the sample and hold circuit 318. The processing controlling circuit 310 causes an electromagnetic induction signal to be transmitted with a fixed transmission duration from the X-axis direction loop coil group 121 and the Y-axis direction loop coil group 122 on the basis of an input signal from the A/D conversion circuit 319.

In each of the loop coils of the X-axis direction loop coil group 121 and the Y-axis direction loop coil group 122, an induced voltage is generated by an electromagnetic induction signal transmitted thereto from the parallel resonance circuit 203 of the stylus circuit 200. The processing controlling circuit 310 calculates coordinate values of the indication position in the X-axis direction and the Y-axis direction by the normal stylus or the ink stylus on the basis of the level of the voltage value of the induced voltage generated in each loop coil.

Further, the processing controlling circuit 310 supplies a signal for controlling a transmission signal between on and off and a signal for transmission signal level control to the current driver 313 and performs a reception process of additional information such as writing pressure data or a stylus ID from the normal stylus or the ink stylus. The processing controlling circuit 310 detects an on/off signal formed, for example, from an ASK signal from the normal stylus or the ink stylus as a digital signal of a plurality of bits to detect additional information such as writing pressure data or a stylus ID. Then, the processing controlling circuit 310 outputs the information of the indication position by the normal stylus or the ink stylus and the detected additional information such as the writing pressure data or the stylus ID to the control circuit 100.

Further, as depicted in FIG. 4, the touch detection sensor 13 is connected to the touch position detection circuit 32. The touch detection sensor 13 is a touch detection sensor of the capacitive type, and in the present example, detects an instruction operation by a finger of a user through an interaction by capacitive coupling and outputs a result of the detection to the touch position detection circuit 32. The touch position detection circuit 32 detects coordinate information according to a gesture operation by a finger touch in the detection region DA from an output of the touch detection sensor 13.

A gesture operation on the touch detection sensor 13 is an operation for instructing a predetermined process for a display image based on writing information according to a writing operation by the stylus detected by the stylus detection sensor 12. For example, a gesture for drawing an arc by a finger in the detection region of the inputting face is used as a rotation instruction operation for a display image based on writing information, and an operation by two fingers of increasing or decreasing the distance between the two fingers is determined as an instruction operation for expansion or reduction of a display image. The touch position detection circuit 32 supplies coordinate information of a trace of the operation of the finger touch detected by the touch detection sensor 13 to the control circuit 100. The control circuit 100 generates display image processing information from the received coordinate information of the trace of the operation of the finger touch.

Example of Circuit Configuration of Touch Position Detection Circuit 32

An example of a configuration of the touch detection sensor 13 and the touch position detection circuit 32 is described with reference to FIG. 6. In the present example, the touch detection sensor 13 is configured as a sensor of the cross point capacitive type in order to detect a multi-touch event to detect a plurality of fingers at a time.

The touch detection sensor 13 is configured from a plurality of first electrodes 13X formed in a Y-axis direction and a plurality of second electrodes 13Y formed in an X-axis direction orthogonal to the Y-axis direction. Further, the first electrodes 13X are disposed in a spaced relationship by a predetermined distance from each other in the X-axis direction. Meanwhile, the second electrodes 13Y are disposed in a spaced relationship by a predetermined distance from each other in the Y-axis direction.

The first electrodes 13X and the second electrodes 13Y are disposed on the front face side and the rear face side of a board in a state in which they are isolated from each other. Although the first electrodes 13X and the second electrodes 13Y can be formed on the same one face side of the substrate, in this case, in a region of a cross point which is an intersecting point between each first electrode 13X and each second electrode 13Y orthogonal to each other, an insulating material is interposed between the first electrode 13X and the second electrode 13Y to electrically isolate them from each other.

The touch position detection circuit 32 includes a transmission signal generation circuit 321, a transmission electrode selection circuit 322, a reception electrode selection circuit 323, a reception signal processing circuit 324, a position information outputting circuit 325 and a processing controlling circuit 320.

In the present example, the touch position detection circuit 32 discretely executes a position detection process after every predetermined time interval, for example, after every ten milliseconds, under the control of the processing controlling circuit 320 to individually detect a plurality of position indications by finger touches on the touch detection sensor 13 to obtain individual position detection results.

The transmission signal generation circuit 321 and the transmission electrode selection circuit 322 configure a transmission signal supplying circuit, and the reception electrode selection circuit 323 and the reception signal processing circuit 324 configure a signal reception circuit. Further, in the present example, the first electrodes 13X are used as reception electrodes and the second electrodes 13Y are used as transmission electrodes.

The transmission signal generation circuit 321 supplies a predetermined transmission signal to the transmission electrode selection circuit 322 at a predetermined timing under the control of the processing controlling circuit 320. As the predetermined transmission signal, for example, an orthogonal spread code or the like can be used (refer, for example, to Japanese Patent Laid-Open No. 2003-22158).

The transmission electrode selection circuit 322 selects a predetermined second electrode 13Y under the selection control of the processing controlling circuit 320. To the second electrode 13Y selected by the transmission electrode selection circuit 322, a transmission signal from the transmission signal generation circuit 321 is supplied.

The reception electrode selection circuit 323 successively selects a first electrode 13X under the control of the processing controlling circuit 320 and supplies a reception signal from the selected first electrode 13X to the reception signal processing circuit 324.

The reception signal processing circuit 324 detects, by the first electrodes 13X, a signal variation of a reception signal caused by a user performing a position instruction input on the touch detection sensor 13 under the control of the processing controlling circuit 320 and supplies the detection output to the position information outputting circuit 325.

The position information outputting circuit 325 generates, based on the control by the processing controlling circuit 320, as a position detection result, a coordinate output which is an indication position detection signal corresponding to the position indicated by a finger from the first electrode 13X which indicates the signal variation and the second electrode 13Y to which the transmission signal is supplied then from a detection output of the reception signal processing circuit 324, and outputs the position detection result to the processing controlling circuit 320.

The processing controlling circuit 320 receives the coordinate output of the position detection result from the position information outputting circuit 325 and detects the position indicated by a finger or a moving operation (gesture operation) and supplies a detection result to the control circuit 100.

Then, as depicted in FIG. 4, the operation button group 15 is connected to the operation input interface 33. The operation input interface 33 detects an operation portion operated by the user from within the operation button group 15 and detects the inputting operation, and supplies detection output information to the control circuit 100. As described hereinabove, the operation buttons of the operation button group 15 are for predetermined processing for a display image based on writing information according to a writing operation by a stylus detected by the stylus detection sensor 12. For example, by an operation of the operation buttons of the operation button group 15, a color of a display image, a thickness of writing by a stylus, a writing tool type and so forth can be set and also instruction operations for movement, rotation, enlargement and reduction of a display image can be performed. The control circuit 100 generates display image processing information from detection output information of an operation input received from the operation input interface 33.

Now, the circuitry on the output side of the control circuit 100 is described. To the USB (Universal Serial Bus) interface 34, a USB connector 37 is connected. For example, if a USB cable connected at one end side thereof to an external apparatus formed from a personal computer or the like is connected at the other end portion thereof to the USB connector 37, then the control circuit 100 detects the connection through the USB interface 34. In a state in which the hand-written information processing apparatus 10 is connected to an external apparatus through a USB cable, it can receive supply of a power supply voltage from the external apparatus.

Further, the wireless communication circuit 35 is configured, in the present example, from a short-range wireless communication circuit of the Bluetooth (registered trademark) standard. Accordingly, to the hand-written information processing apparatus 10, not only a personal computer but also a high function mobile phone terminal such as a smartphone can be connected as an external apparatus only if the personal computer or the high function mobile phone terminal is an electronic apparatus which incorporates a short-range wireless communication circuit of the Bluetooth (registered trademark).

The control circuit 100 can perform, as regards sending out of output information to the external apparatus, both of sending out through a USB cable connected to the USB connector 37 and sending out through the wireless communication circuit 35. However, in the present embodiment, when the control circuit 100 detects that an external apparatus is connected to the USB connector 37 through a USB cable, the control circuit 100 prioritizes the sending out of output information through the USB cable.

The control circuit 100 has also a function for accumulating output information into the memory 36.

The hand-written information processing apparatus 10 of the present embodiment has a tablet mode as a first mode and a paper mode as a second mode.

The tablet mode is a mode in which a display image based on writing information according to a writing operation by the normal stylus as a first stylus detected by the stylus detection sensor 12 is displayed on the display screen of the external apparatus connected to the hand-written information processing apparatus 10 through a USB cable or the wireless communication circuit 35. In the tablet mode, a predetermined process such as movement, rotation, enlargement or reduction can be performed for a display image displayed on the display screen of the external apparatus in response to a finger touch detected by the touch detection sensor 13 or to an operation input performed through the operation button group 15.

In the tablet mode, the output signal format of information to be sent out from the control circuit 100 to the external apparatus is configured, as depicted in FIG. 7A, from writing information detected by the stylus detection sensor 12, stylus additional information detected by the control circuit 100 through the stylus detection sensor 12 and display image processing information. The display image processing information is generated on the basis of operation information detected on the basis of a finger touch detected by the touch detection sensor 13 or detection output information of an operation input performed through the operation button group 15.

The paper mode is a mode in which a writing trace can be formed by the ink stylus as a second stylus on a paper sheet 17 placed on the inputting face of the hand-written information processing apparatus 10 by the clip member 16 and the writing information corresponding to the writing trace formed on the paper sheet 17 is detected by the stylus detection sensor 12 and is stored into the built-in memory 36 or sent out to the external apparatus. In the paper mode, a predetermined process for a display image originating from a finger touch detected by the touch detection sensor 13 or an operation input performed through the operation button group 15 is invalidated. Accordingly, the hand-written information processing apparatus 10 is configured such that display image processing information is not applied to writing information by performing such a process as to avoid display image processing information in the tablet mode from being included in information to be outputted to the built-in memory 36 or the external apparatus.

It is to be noted that, in the paper mode, not all of operations of the operation buttons of the operation button group 15 are invalidated but operation inputs for performing a predetermined process for a display image are invalidated, and the hand-written information processing apparatus 10 is configured such that a specific operation by the operation button group 15 is validated. In particular, the hand-written information processing apparatus 10 is configured such that, also in the paper mode, a predetermined operation can be applied to writing information retained in the memory 36 from information corresponding to an operation input by a predetermined button operation of the operation button group 15 such that a specific operation, namely, a page feeding operation for the paper sheet 17 or a changeover operation between a standard paper mode and a live paper mode of the paper mode hereinafter described in the operation button group 15, is made valid. The page feeding operation of the paper sheet 17 is an operation performed when the paper sheet 17 fixed to the inputting face of the hand-written information processing apparatus 10 is changed by the clip member 16.

The output signal format of information to be sent out from the control circuit 100 to the external apparatus in the paper mode is configured from writing information detected by the stylus detection sensor 12 and stylus additional information detected by the control circuit 100 through the stylus detection sensor 12 as depicted in FIG. 7B.

Then, in the present embodiment, the paper mode includes a standard paper mode in which writing information and stylus additional information of the output signal format illustrated in FIG. 7B are stored into the built-in memory 36 and a live paper mode in which such writing information and stylus additional information are stored into the built-in memory 36 and are sent out to an external apparatus.

The control circuit 100 has an input processing function for processing signals received from the stylus position detection circuit 31, touch position detection circuit 32 and operation input interface 33, a mode setting function for setting which one of the tablet mode and the paper mode described hereinabove the mode is to be used and a function for controlling an inputting process and an outputting process in response to the set mode. The control circuit 100 has also a function for deciding a connection situation of an external apparatus to the output side and selecting a route along which output information is to be sent out.

Although the hand-written information processing apparatus 10 can be configured also such that one of the operation buttons of the operation button group 15 is used as an operation button for mode changing such that changeover between the tablet mode and the paper mode is performed in response to an operation of the operation button, in the present embodiment, changeover between the tablet mode and the paper mode is performed automatically. In particular, in the present embodiment, two different types of a normal stylus and an ink stylus are used as the stylus. In the paper mode, the ink stylus which can visually write on the paper sheet 17 is used. Meanwhile, in the tablet mode, the normal stylus is used because no writing on the paper sheet 17 is required. Further, in the present embodiment, the normal stylus and the ink stylus individually have unique stylus IDs stored in the storage unit and are configured such that the stylus IDs are sent out as additional information to the stylus detection sensor 12.

Taking the foregoing into consideration, in the present embodiment, in a state in which the normal stylus is detected by the stylus detection sensor 12, the hand-written information processing apparatus 10 should be controlled to the tablet mode, and in another state in which the ink stylus is detected by the stylus detection sensor 12, the hand-written information processing apparatus 10 should be controlled to the paper mode. Further, the control circuit 100 has a mode setting function for setting one of the modes by recognizing whether the stylus ID received through the stylus detection sensor 12 is the stylus ID of the normal stylus or the stylus ID of the ink stylus.

It is to be noted that, in the present embodiment, the hand-written information processing apparatus 10 is configured such that changeover between the standard paper mode and the live paper mode in the paper mode can be performed by an operation of a predetermined operation button in the operation button group 15.

Referring to FIG. 4, circuits for implementing the functions described above of the control circuit 100 are depicted as a configuration of functional blocks. The functional blocks can be implemented by a computer, which configures the control circuit 100, executing a software program, and here, are depicted for description. It is to be noted that naturally it is possible also to configure the functional blocks from hardware circuits to configure the control circuit 100.

As depicted in FIG. 4, in the present example, the control circuit 100 includes a writing information generation circuit 101, a stylus additional information generation circuit 102, a stylus recognition circuit 103, a display image processing information generation circuit 104, an operation input decision circuit 105 and a mode changeover controlling circuit 106 as the functional blocks.

The writing information generation circuit 101 generates, from coordinate information from the stylus position detection circuit 31, writing information according to a writing operation in the detection region DA of the inputting face by the normal stylus or the ink stylus. In the present example, where one stroke is configured from a series of writing operations after the normal stylus or the ink stylus is brought into contact with the inputting face of the detection region DA until it is spaced away from the inputting face of the detection region DA, writing information in a unit of a stroke is generated as data, for example, of the vector data format. In this case, time information is added to the data of the stroke. The time information is, for example, time information of the time of starting of a stroke (upon contact with the inputting face) and time information of the time of ending (time at which the stylus is spaced away from the inputting face). The writing information generated by the writing information generation circuit 101 is supplied to the mode changeover controlling circuit 106.

The stylus additional information generation circuit 102 receives writing pressure information or a stylus ID sent thereto from the stylus position detection circuit 31 and generates stylus additional information including them. The stylus additional information generation circuit 102 supplies the generated stylus additional information to the mode changeover controlling circuit 106.

The stylus recognition circuit 103 extracts a stylus ID from within an output sent thereto from the stylus position detection circuit 31 and recognizes whether the extracted stylus ID is the stylus ID of the normal stylus or the stylus ID of the ink stylus thereby to recognize whether the stylus positioned closely to the detection region DA of the inputting face is the normal stylus or the ink stylus. Then, the stylus recognition circuit 103 supplies a result of the recognition to the mode changeover controlling circuit 106.

The display image processing information generation circuit 104 decides a gesture operation by a finger of the user on the touch detection sensor 13 on the basis of coordinate information from the touch position detection circuit 32 and generates corresponding display image processing information from a result of the decision.

The operation input decision circuit 105 receives detection output information of an operation input from the operation input interface 33 and decides which one of the operation buttons is operated and what inputting operation is performed, and then generates corresponding operation decision result information. Then, if the detection output information of the operation input is for display image processing, the operation input decision circuit 105 supplies the generated operation decision result information to the display image processing information generation circuit 104. The display image processing information generation circuit 104 generates, from the received operation decision result information, corresponding display image processing information and supplies the display image processing information to the mode changeover controlling circuit 106.

Further, if the operation input decision circuit 105 decides that the detection output information of the operation input indicates a page feeding operation or a changeover operation between the standard paper mode and the live paper mode of the paper mode, then the operation input decision circuit 105 supplies the generated operation decision result information to the mode changeover controlling circuit 106. The mode changeover controlling circuit 106 recognizes, from the received operation decision result information, the page feeding direction or the changeover operation between the standard paper mode and the live paper mode of the paper mode.

The mode changeover controlling circuit 106 receives a recognition result from the stylus recognition circuit 103 and determines whether the tablet mode is to be established or the paper mode is to be established. Then, the mode changeover controlling circuit 106 generates, in the table mode, output information of the output signal format depicted in FIG. 7A but generates, in the paper mode, output information of the output signal format depicted in FIG. 7B from writing information from the writing information generation circuit 101, stylus additional information from the stylus additional information generation circuit 102 and display image processing information from the display image processing information generation circuit 104.

Further, the mode changeover controlling circuit 106 detects, in the tablet mode, whether or not an external apparatus is connected to the USB connector 37 through a USB cable and sends out, if an external apparatus is connected, output information of the output signal format depicted in FIG. 7A to the external apparatus through the USB cable. At this time, the output information is transmitted to the external apparatus such that output information of the tablet mode is to be outputted from a logical port for the tablet mode.

Then, in the tablet mode, if the mode changeover controlling circuit 106 decides that no external apparatus is connected through a USB cable, it transmits output information of the output signal format depicted in FIG. 7A to the external apparatus through the wireless communication circuit 35. To this transmission information, identification information indicating that the output information is a transmission signal of the tablet mode is added.

Further, in the paper mode, the mode changeover controlling circuit 106 decides whether or not a changeover instruction to the live paper mode is received, and if it is decided that a changeover instruction to the live paper mode is not received, then the mode changeover controlling circuit 106 establishes the standard paper mode and stores generated output information of the output signal format depicted in FIG. 7B into the memory 36.

Further, in the paper mode, if the mode changeover controlling circuit 106 decides that a changeover instruction to the live paper mode is performed, then it establishes the live paper mode and detects whether or not an external apparatus is connected to the USB connector 37 through a USB cable. If an external apparatus is connected, then the mode changeover controlling circuit 106 sends out output information of the output signal format depicted in FIG. 7B to the external apparatus through the USB cable. However, if the mode changeover controlling circuit 106 decides that no external apparatus is connected through a USB cable, then it transmits output information of the output signal format depicted in FIG. 7B to the external apparatus through the wireless communication circuit 35. If the output information is to be sent out to the external apparatus through a USB cable, the output information is transmitted to the output apparatus such that it is outputted from a logical port for the paper mode. On the other hand, if it is to be transmitted by wireless transmission, then identification information indicating that the transmission information is a transmission signal of the paper mode is added to the transmission information.

Furthermore, in the present embodiment, the mode changeover controlling circuit 106 generates, in the paper mode, a stopping control signal for stopping action of the touch position detection circuit 32 and sends the stopping control signal to the touch position detection circuit 32 to stop its action. In this case, together with this, supply of power to the touch position detection circuit 32 and the touch detection sensor 13 is stopped to achieve power saving. It is to be noted that the mode changeover controlling circuit 106 may be configured such that, in the paper mode, supply of power to the operation buttons of the operation button group 15 is stopped or action stopping of and stopping of supply of power to a corresponding interface portion of the operation input interface 33 is stopped such that, even if an operation button for display image processing in the operation button group 15 is operated, the operation is invalidated. Alternatively, the mode changeover controlling circuit 106 performs a signal process for preventing generated operation information from being applied inappropriately to writing information.

Example of Processing Action of Control Circuit 100

An example of processing action of the control circuit 100 configured in such a manner as described above is described with reference to flow charts of FIGS. 8 to 12.

Figure 8:
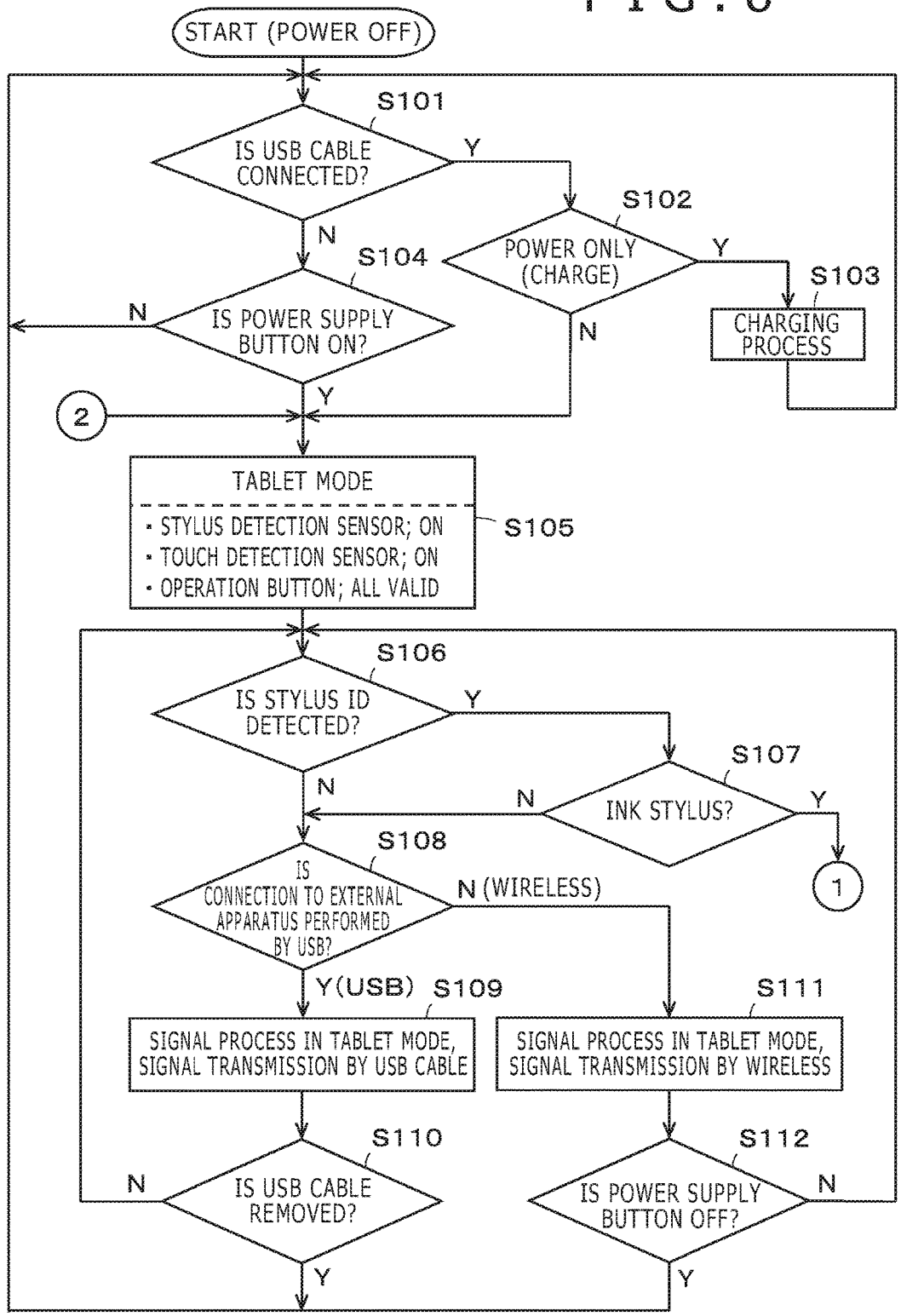
FIG. 8 is a view depicting part of a flow chart illustrating an example of a flow of processing action of the embodiment of the hand-written information processing apparatus according to the present invention.

In the hand-written information processing apparatus 10 of the present embodiment, processing is started from the start of FIG. 8 in a state in which a power supply button 15P is not on. In this case, though not depicted, the hand-written information processing apparatus 10 includes a power supply formed from a rechargeable battery, and to portions of the control circuit 100 for monitoring an operation of the power supply button 15P or connection of a USB cable, a power supply voltage is normally supplied.

As depicting in FIG. 8, the control circuit 100 decides whether or not an external apparatus is connected through a USB cable (step S101). If it is decided at step S101 that an external apparatus is connected through a USB cable, then the control circuit 100 decides whether or not the USB cable is for exclusive use for charging (step S102), and if it is decided that the USB cable is for exclusive use for charging, then the control circuit 100 performs a charging process for the rechargeable battery (step S103) and returns the processing to step S101.

If it is decided at step S102 that the USB cable is not for exclusive use for charging but has a function for data communication, then the control circuit 100 controls the hand-written information processing apparatus 10 to the tablet mode (step S105). At this time, the battery is used as a power supply while a charging process into the battery is performed through the USB cable.

At step S105, all of the stylus detection sensor 12 and stylus position detection circuit 31, the touch detection sensor 13 and touch position detection circuit 32, and the operation button group 15 and operation input interface 33 on the input side are placed into an operative state.

On the other hand, if it is decided at step S101 that an external apparatus is not connected through a USB cable, then the control circuit 100 decides whether or not the power supply button 15P is operated into an on state (step S104). If it is decided at step S104 that the power supply button 15P is not operated into an on state, then the control circuit 100 returns the processing to step S101.

On the other hand, if it is decided at step S104 that the power supply button 15P is operated into an on state, then the control circuit 100 advances the processing step S105, at which the hand-written information processing apparatus 10 is placed into the tablet mode. At this time, power is received from the battery.

Then, the control circuit 100 decides whether or not a stylus ID is detected from within the information received from the stylus position detection circuit 31 (step S106). If it is decided at step S106 that a stylus ID is detected, then the control circuit 100 decides whether or not the detected stylus ID is the stylus ID of the ink stylus (step S107).

If it is decided at step S106 that a stylus ID is not detected or if it is decided at step S107 that the detected stylus ID is not the stylus ID of the ink stylus but the stylus ID of the normal stylus, then the control circuit 100 decides whether or not the control circuit 100 is connected to an external apparatus through a USB cable (step S108).

If it is decided at step S108 that the control circuit 100 is connected to an external apparatus through a USB cable, then the control circuit 100 generates output information of the tablet mode of the output signal format depicted in FIG. 7A and transmits the generated output information to the external apparatus through the USB cable connected to the USB connector 37 (step S109).

Then, the control circuit 100 discriminates whether or not the USB cable is removed from the USB connector 37 (step S110), and if it is decided that the USB cable is removed, then the control circuit 100 returns the processing to step S101. On the other hand, if it is decided at step S110 that the USB cable is not removed, then the control circuit 100 returns the processing to step S106.

Then, if it is decided at step S108 that the control circuit 100 is not connected to an external apparatus through a USB cable but is connected to an external apparatus by the wireless communication circuit 35, then the control circuit 100 generates output information of the tablet mode of the output signal format depicted in FIG. 7A and transmits the generated output information by wireless transmission to the external apparatus through the wireless communication circuit 35 (step S111).

Then, the control circuit 100 decides whether or not the power supply button 15P is operated into an off state (step S112), and if it is decided that the power supply button 15P is operated into an off state, then the control circuit 100 returns the processing to step S101. On the other hand, if it is decided at step S112 that the power supply button 15P is not operated into an off state, then the control circuit 100 returns the processing to step S106.

Figure 9:
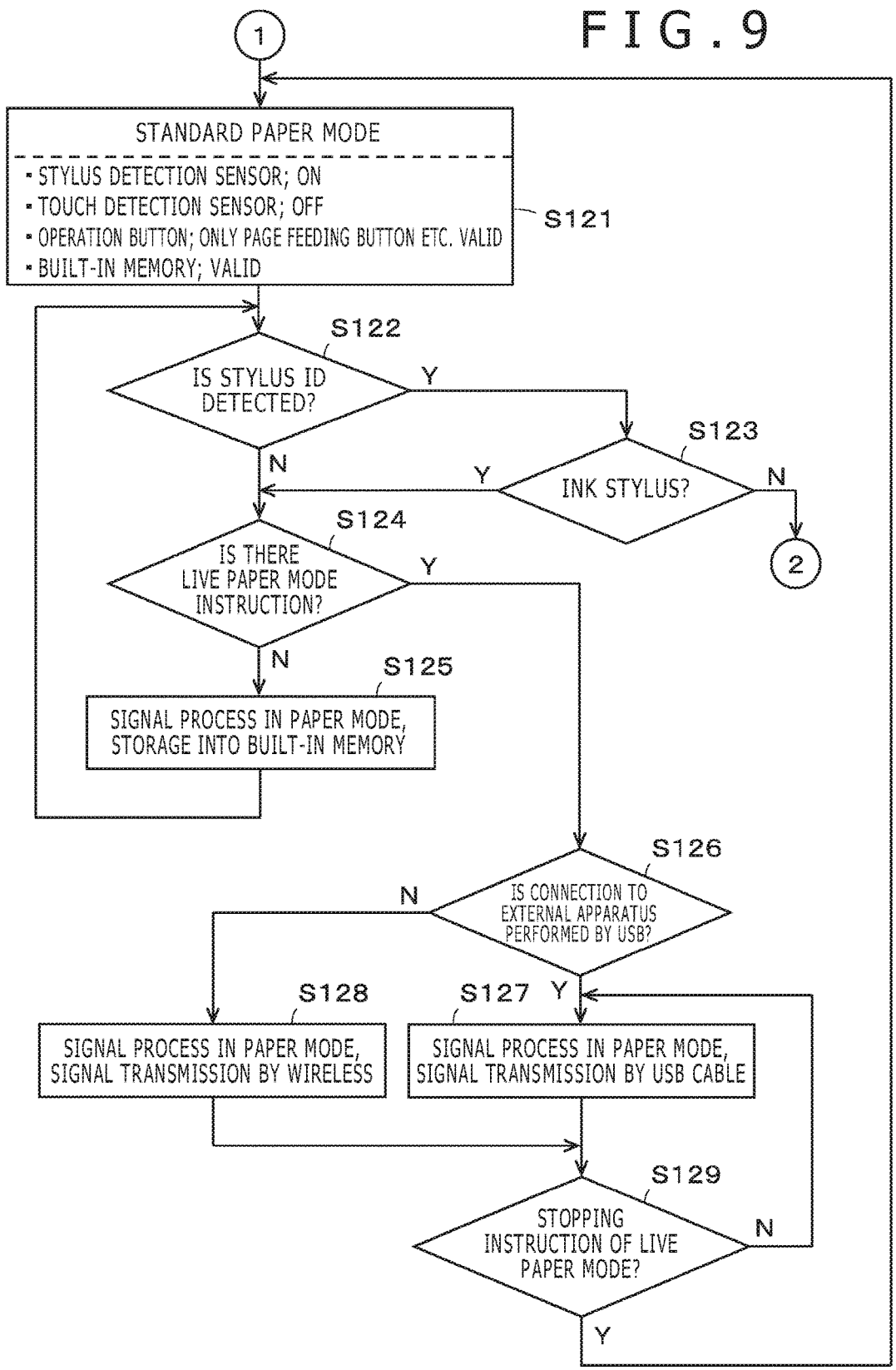
FIG. 9 is a view depicting part of the flow chart illustrating the example of the flow of processing action of the embodiment of the hand-written information processing apparatus according to the present invention.

If it is decided at step S107 that the detected stylus ID is the stylus ID of the ink stylus, then the control circuit 100 controls the hand-written information processing apparatus 10 to the paper mode (standard paper mode) (step S121 of FIG. 9). At step S121, the control circuit 100 controls the stylus detection sensor 12 and the stylus position detection circuit 31 on the input side to an operative state and controls the touch detection sensor 13 to an inoperative state; controls the operation button group 15 and the operation input interface 33 such that information generated in response to operation inputs of the operation button group 15 and the operation input interface 33 is selectively applied so as to invalidate all operations other than a page feeding operation and a changeover operation between the standard paper mode and the live paper mode; and determines the built-in memory 36 as a transmission destination of the output information.

Then, the control circuit 100 decides whether or not a stylus ID is detected from the information received from the stylus position detection circuit 31 (step S122). If it is decided at step S122 that a stylus ID is detected, then the control circuit 100 decides whether or not the detected stylus ID is the stylus ID of the ink stylus (step S123).

If it is decided at step S123 that the detected stylus ID is not the stylus ID of the ink stylus but the stylus ID of the normal stylus, then the control circuit 100 returns the processing to step S105 of FIG. 8 and repeats the processes at the steps beginning with step S105.

If it is decided at step S122 that a stylus ID is not detected or if it is decided at step S123 that the detected stylus ID is the stylus ID of the ink stylus, then the control circuit 100 decides whether or not there is a changeover instruction to the live paper mode (step S124).

If it is decided at step S124 that there is no changeover instruction to the live paper mode, then the control circuit 100 performs signal processing of the paper mode (standard paper mode) of the output signal format depicted in FIG. 7B and stores the output information into the built-in memory 36 (step S125). Then, the control circuit 100 returns the processing to step S122 to repeat the processes at the steps beginning with step S122.

If it is decided at step S124 that there is a changeover instruction to the live paper mode, then the control circuit 100 decides whether or not it is connected to an external apparatus through a USB cable (step S126).

If it is decided at step S126 that the control circuit 100 is connected to an external apparatus through a USB cable, then the control circuit 100 generates output information of the paper mode of the output signal format depicted in FIG. 7B, and transmits the generated output information to the external apparatus through the USB cable connected to the USB connector 37 and stores the generated output information into the built-in memory 36 (step S127).

Then, the control circuit 100 decides whether or not a stopping instruction to the live paper mode is received (step S129), and if it is decided that a stopping instruction to the live paper mode is not received, then the processing returns to step S127. On the other hand, if it is decided at step S129 that a stopping instruction to the live paper mode is received, then the control circuit 100 returns the processing to step S121 to repeat the processes at the steps beginning with step S121.

On the other hand, if it is decided at step S126 that the control circuit 100 is not connected to an external apparatus through a USB cable but is connected to an external apparatus through the wireless communication circuit 35, then the control circuit 100 generates output information of the paper mode of the output signal format depicted in FIG. 7B, and transmits the generated output information by wireless transmission to the external apparatus through the wireless communication circuit 35 and stores the generated output information into the built-in memory 36 (step S128). The control circuit 100 advances the processing to step S129 after the process at step S128.

Now, signal processing in the tablet mode at step S109 and step S111 of FIG. 8 is described with reference to a flow chart of FIG. 10.

The control circuit 100 first decides whether or not there exists information of the output signal format of FIG. 7B stored in the memory 36 in the paper mode (such information is hereinafter referred to as sketch data) (step S131). If it is decided at step S131 that there exists sketch data stored in the memory 36, then the control circuit 100 reads out the sketch data stored in the memory 36 and transmits the sketch data to the external apparatus, at step S109, through the USB cable, but at step S111, through the wireless communication circuit 35 (step S132).

Then, the control circuit 100 executes, by the stylus detection sensor 12 and the stylus position detection circuit 31, a detection process of writing information by a writing operation by the normal stylus (step S133). If it is decided at step S131 that there exists no sketch data stored in the memory 36, then the control circuit 100 bypasses the process at step S132 and executes the process at step S133.

Next to step S133, the control circuit 100 executes a detection process of a finger touch operation by the touch detection sensor 13 and the touch position detection circuit 32 (step S134). Then, the control circuit 100 executes a detection process of an operation input of an operation button of the operation button group 15 (step S135). The control circuit 100 generates an output signal of the tablet mode depicted in FIG. 7A on the basis of results of the detection process at step S133, step S134 and step S135, and transmits the output signal to the external apparatus, at step S109, through the USB cable, but at step S111, through the wireless communication circuit 35 (step S136).

Then, the control circuit 100 decides whether or not an end event based on removal of the USB cable, a turning off operation of the power supply button 15P or mode changeover based on a result of detection of a stylus ID occurs (step S137), and if it is decided that no end event occurs, then the control circuit 100 returns the processing to step S133 to repeat the processes at the steps beginning with step S133. Then, if it is decided at step S137 that an end event occurs, then the control circuit 100 ends the present processing routine.

Figure 10:
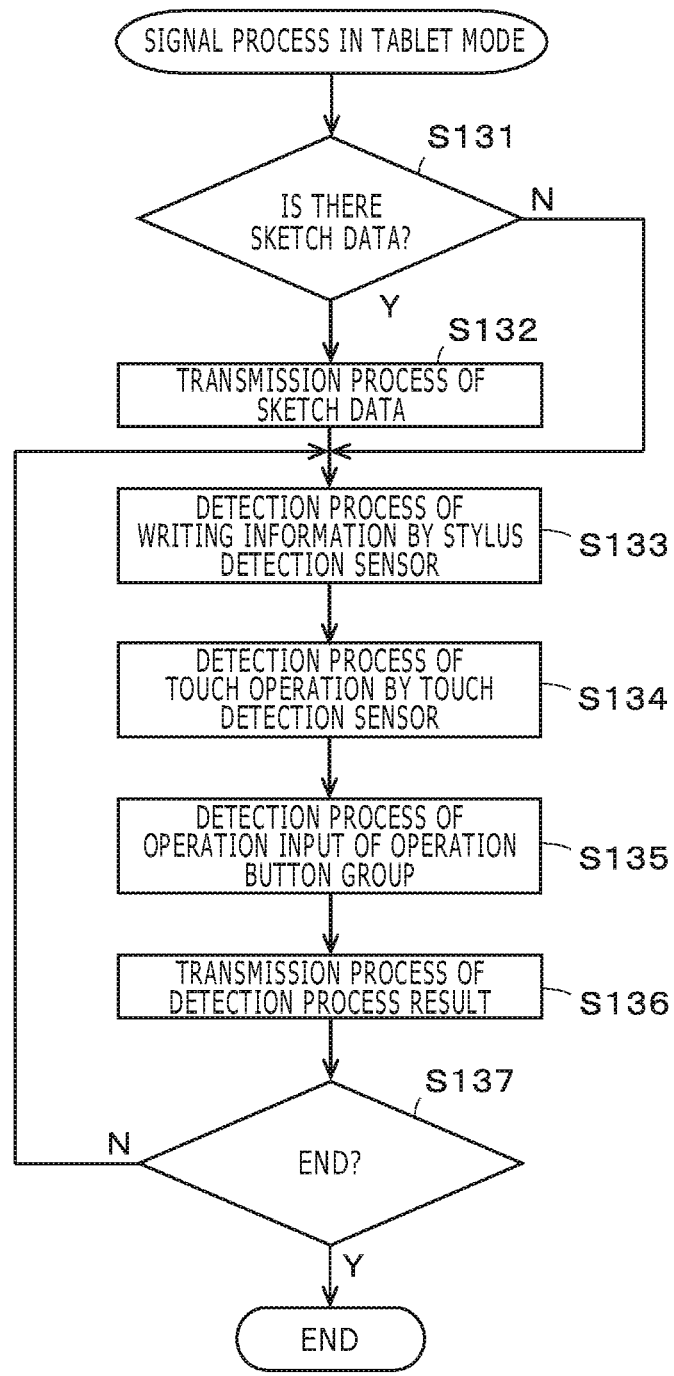
FIG. 10 is a view depicting a flow chart illustrating the example of the flow of processing action of the embodiment of the hand-written information processing apparatus according to the present invention.

It is to be noted that the order of the detection processes at step S133, step S134 and step S135 in the processing routine of FIG. 10 is not limited to the example of FIG. 10 but is arbitrary.

Figure 11:
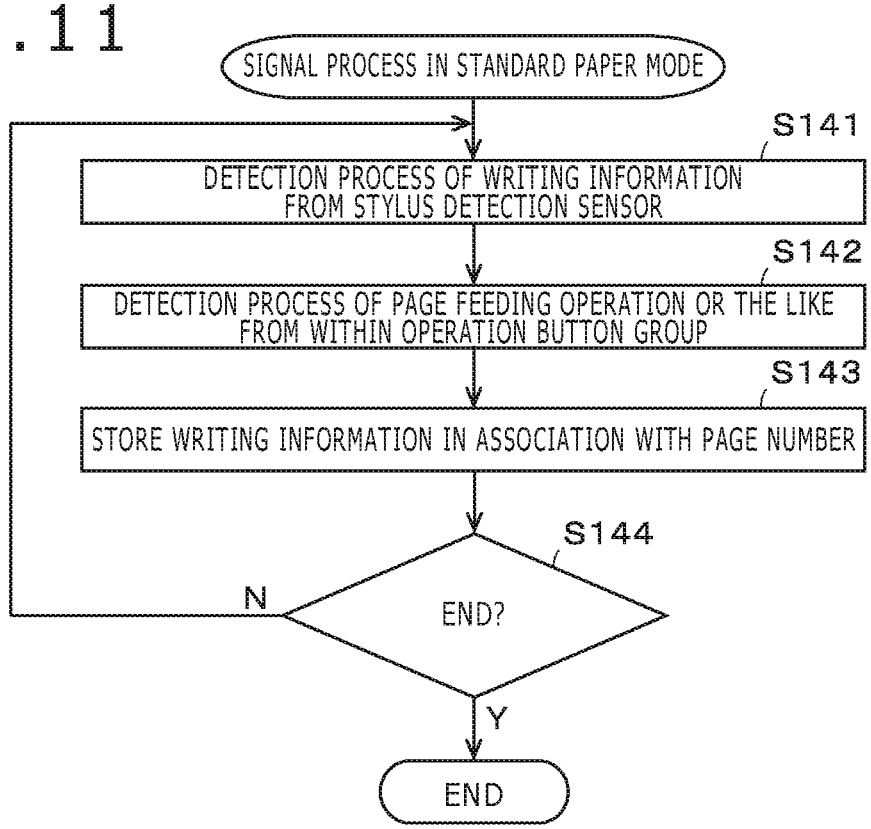
FIG. 11 is a view depicting a flow chart illustrating the example of the flow of processing action of the embodiment of the hand-written information processing apparatus according to the present invention.

Now, the signal process in the standard paper mode at step S125 of FIG. 9 is described with reference to a flow chart of FIG. 11.

The control circuit 100 first executes a detection process, by the stylus detection sensor 12 and the stylus position detection circuit 31, of writing information by a writing operation by the normal stylus (step S141). Then, the control circuit 100 executes a detection process of a page feeding operation in the operation button group 15 or a detection process of a changeover operation between the standard paper mode and the live paper mode (step S142).

Then, the control circuit 100 generates an output signal of the paper mode depicted in FIG. 7B on the basis of results of the detection processes at step S141 and step S142 and stores the output signal into the built-in memory 36 (step S143). The output signal of the paper mode is stored in an associated relationship with a page number.

Then, the control circuit 100 decides whether or not an end event based on removal of the USB cable, a turning off operation of the power supply button 15P or mode changeover based on a result of detection of a stylus ID occurs (step S144), and if it is decided that no end event occurs, then the control circuit 100 returns the processing to step S141 to repeat the processes at the steps beginning with step S141. Then, if it is decided at step S144 that an end event occurs, then the control circuit 100 ends the present processing routine.

It is to be noted that, while, in the example described above, the processes at step S141 and step S142 are executed normally, where an application program for performing processing of a relationship to the paper mode is prepared separately, only when the application program is operative, the processes at step S141 and step S142 may be executed.

Figure 12:
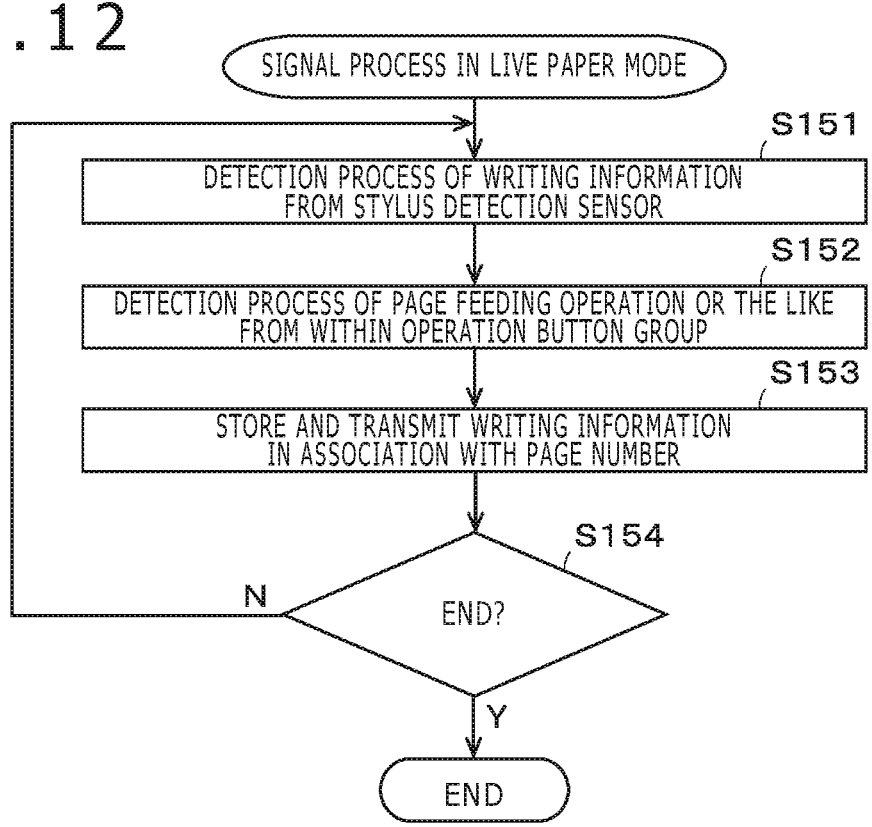
FIG. 12 is a view depicting a flow chart illustrating the example of the flow of processing action of the embodiment of the hand-written information processing apparatus according to the present invention.

Now, signal processing in the live paper mode at step S127 or step S128 of FIG. 9 is described with reference to a flow chart of FIG. 12.

The control circuit 100 first executes a detection process, by the stylus detection sensor 12 and the stylus position detection circuit 31, of writing information by a writing operation by the normal stylus (step S151). Then, the control circuit 100 executes a detection process for a page feeding operation in the operation button group 15 or a changeover operation between the standard paper mode and the live paper mode (step S152).

Then, the control circuit 100 generates an output signal of the paper mode illustrated in FIG. 7B on the basis of results of the detection processes at step S151 and step S152, and stores the output signal into the built-in memory 36 and transmits the output signal to the external apparatus, at step S109, through the USB cable, but at step S111, through the wireless communication circuit 35 (step S153). The output signal of the paper mode has a page number stored in an associated relationship therewith.

Then, the control circuit 100 decides whether or not an end event based on removal of the USB cable, a turning off operation of the power supply button 15P or mode changeover based on a result of detection of a stylus ID occurs (step S154), and if it is decided that no end event occurs, then the control circuit 100 returns the processing to step S151 to repeat the processes at the steps beginning with step S151. Then, if it is decided at step S154 that an end event occurs, then the control circuit 100 ends the present processing routine.

Example of Usage Form of Hand-written Information Processing Apparatus 10

Several examples of a usage form of the hand-written information processing apparatus 10 of the embodiment described above are described below.

First Example of Usage Form

Figure 13:
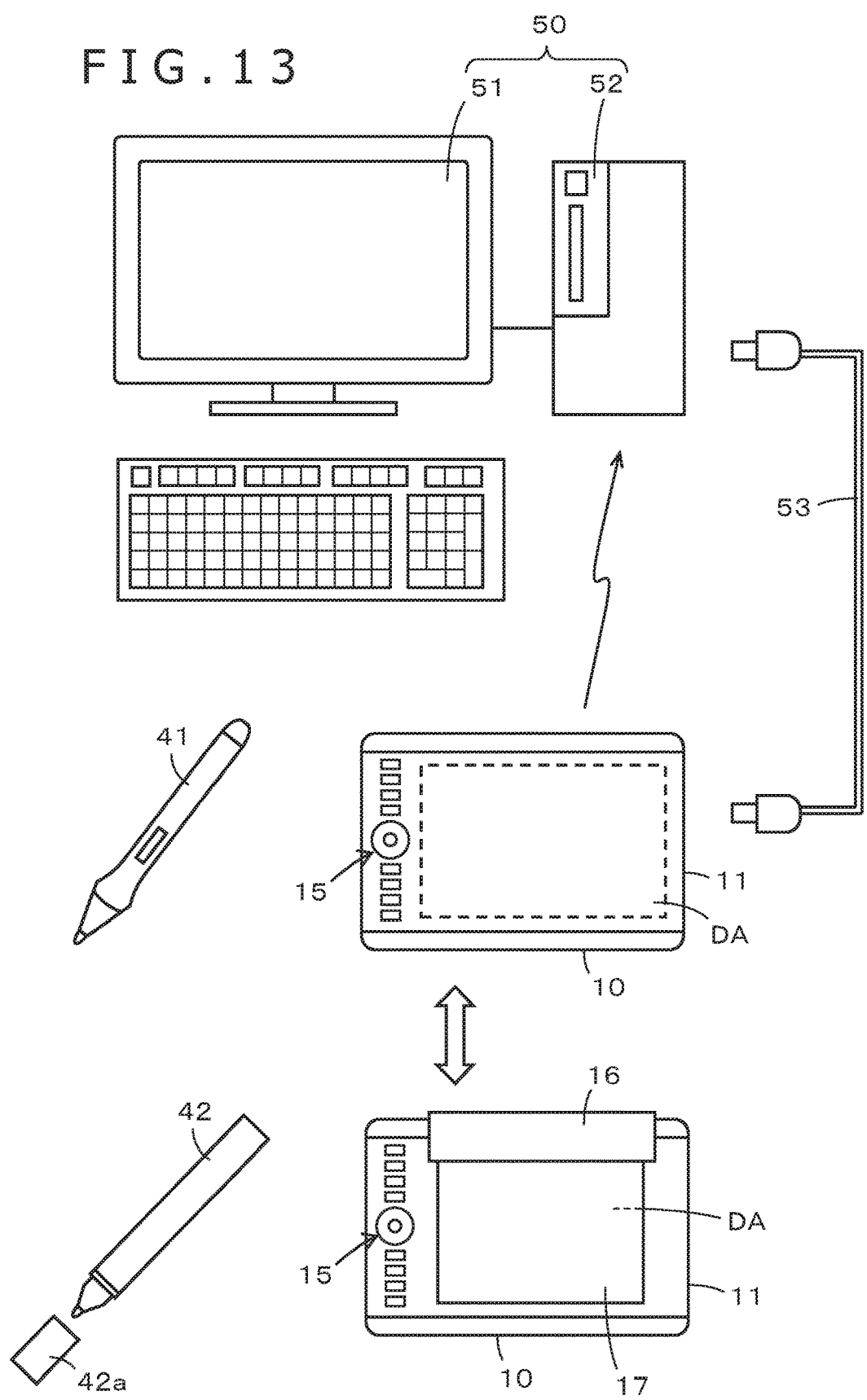
FIG. 13 is a view depicting an example of a usage form of the embodiment of the hand-written information processing apparatus according to the present invention.

FIG. 13 depicts an example of a usage form of the hand-written information processing apparatus 10 where a personal computer 50 configured from a display apparatus 51 connected to a computer main body 52 is used as an external apparatus. The personal computer 50 has installed in advance therein an application program for processing an output signal of the hand-written information processing apparatus 10. In this case, the personal computer 50 and the hand-written information processing apparatus 10 are connected to each other through a USB cable (with full functions) 53 or by wireless communication.

In this connection state, if a normal stylus 41 is positioned closely to the detection region DA of the inputting face of the hand-written information processing apparatus 10, then the hand-written information processing apparatus 10 is placed into the tablet mode, in which the hand-written information processing apparatus 10 transmits an output signal of the output signal mode of FIG. 7A including writing information by a writing operation by the normal stylus 41, stylus additional information and display image processing information to the personal computer 50 through the USB cable 53 or by wireless communication.

The personal computer 50 displays a display image based on the writing information by a writing operation by the normal stylus 41 on the display screen of the display apparatus 51 and performs image operation processes such as movement, rotation, enlargement, reduction and so forth of the display image based on the display image processing information in accordance with the application program.

If the clip member 16 is mounted on the hand-written information processing apparatus 10 as depicted on the lower side in FIG. 13 in this state of the tablet mode and a paper sheet 17 is mounted on the detection region DA of the inputting face by the clip member 16 and then an ink stylus 42 is moved to the proximity of the detection region DA, then the hand-written information processing apparatus 10 is placed into the standard paper mode. Then, if the user performs a changeover operation from the standard paper mode to the live paper mode, then the hand-written information processing apparatus 10 is placed into the live paper mode.

If, in the state of this live paper mode, the user uses the ink stylus 42 to perform a writing operation on the paper sheet 17, then a writing trace which can be visually recognized is formed on the paper sheet 17. At this time, in the hand-written information processing apparatus 10, writing information corresponding to the writing operation by the ink stylus 42 is detected by the stylus detection sensor 12 and the stylus position detection circuit 31. Then, an output signal of the output signal format of FIG. 7B including the detected writing information and stylus additional information is generated and stored into the built-in memory 36 and is transmitted to the personal computer 50 through the USB cable 53 or by wireless communication. It is to be noted that, as depicted in FIG. 13, a cap 42a for protecting the pen tip of a ballpoint pen or a mechanical pencil of the core member of the ink stylus 42 is attached to the ink stylus 42.

The personal computer 50 displays a display image based on writing information corresponding to a writing operation which forms a writing trace on the paper sheet 17 by the ink stylus 42 on the display screen of the display apparatus 51 in accordance with the application program. In this case, since, in the paper mode, the display image processing information is not sent to the personal computer 50, the display image displayed on the display screen corresponds by 1:1 to the writing track on the paper sheet 17.

If, from the state of the live paper mode, the clip member 16 and the paper sheet 17 are removed and the standard paper mode is restored and then the normal stylus 41 is positioned closely to the detection region DA of the inputting face from the hand-written information processing apparatus 10, then the hand-written information processing apparatus 10 is placed into the tablet mode. Consequently, since the writing information and stylus additional information stored in the live paper mode are stored in the memory 36, the stored writing information and stylus additional information are read out first from the memory 36 and then are transmitted to the personal computer 50 through the USB cable 53 or by wireless communication.

The personal computer 50 generates a display image based on the received writing information and displays the display image on the display screen of the display apparatus 51. This display image is same as that which was displayed in the live paper mode before the mode change over. Then, since the writing information stored in the memory 36 in this case is transmitted from the logical port for the tablet mode, it is treated as information of the tablet mode by the application program of the personal computer 50.

Accordingly, if the user subsequently performs a writing operation in the detection region DA of the inputting face using the normal stylus 41, then writing information according to the writing operation is sent to the personal computer 50. The personal computer 50 treats the writing information as information following the writing information stored in the memory 36. In particular, while the display image based on the writing information stored in the memory 36 is depicted as a design, it is possible to amend the design or to add writing information to the design.

It is to be noted that, while, in the present embodiment, changeover from the live paper mode to the tablet mode is performed through the standard paper mode, the hand-written information processing apparatus 10 may be configured such that, when the normal stylus 41 is positioned closely to the detection region DA of the inputting face, the hand-written information processing apparatus 10 in the live paper mode is changed over to the tablet mode.

Second Example of Usage Form

Figure 14:
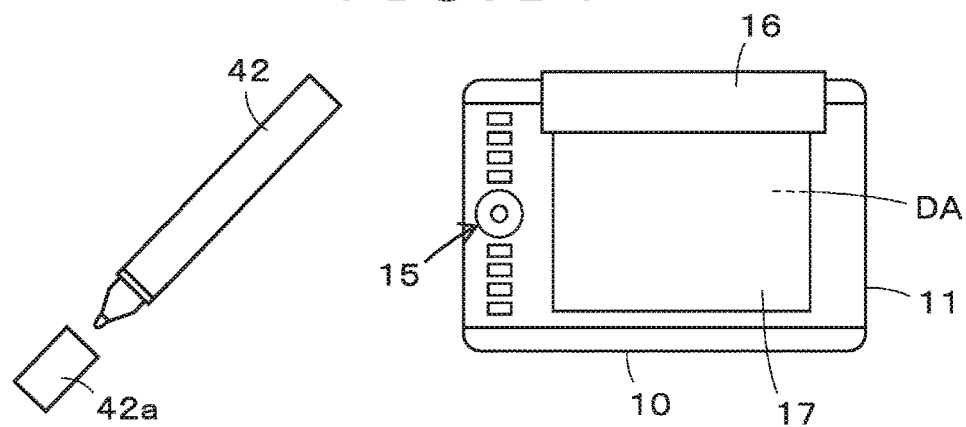
FIG. 14 is a view depicting another example of the usage form of the embodiment of the hand-written information processing apparatus according to the present invention.

FIG. 14 depicts an example of a second usage form of the hand-written information processing apparatus 10, and this example is a form in which the hand-written information processing apparatus 10 is carried to and used in the outside such as, for example, an open-air without being connected to an external apparatus.

In the example of the usage form of FIG. 14, the hand-written information processing apparatus 10 is used in the standard paper mode. In particular, in the present usage form, the user would carry, for example, to an open-air with paper sheet 17 fixed to the hand-written information processing apparatus 10 by the clip member 16 and use the ink stylus 42 to perform a sketch or the like of the open-air. Consequently, into the built-in memory 36 of the hand-written information processing apparatus 10, writing information corresponding to a writing trace drawn on the paper sheet 17 is stored.

After writing information is stored into the memory 36 in the usage form of FIG. 14, if the hand-written information processing apparatus 10 is connected to the personal computer 50 as an example of an external apparatus as depicted in FIG. 13 and then the normal stylus 41 is positioned closely to the detection region DA, then the hand-written information processing apparatus 10 is placed into the tablet mode. Consequently, the writing information stored in the memory 36 is read out and transmitted to the personal computer 50, and is placed into a state in which it can be used as a design in a similar manner as in the foregoing description of the usage form of FIG. 13.

According to the usage form of FIG. 14, a rendered image written on the paper sheet 17 using the ink stylus 42 in an open-air can be used as it is as a design in the tablet mode, which is very convenient.

Third Example of Usage Form

Figure 15:
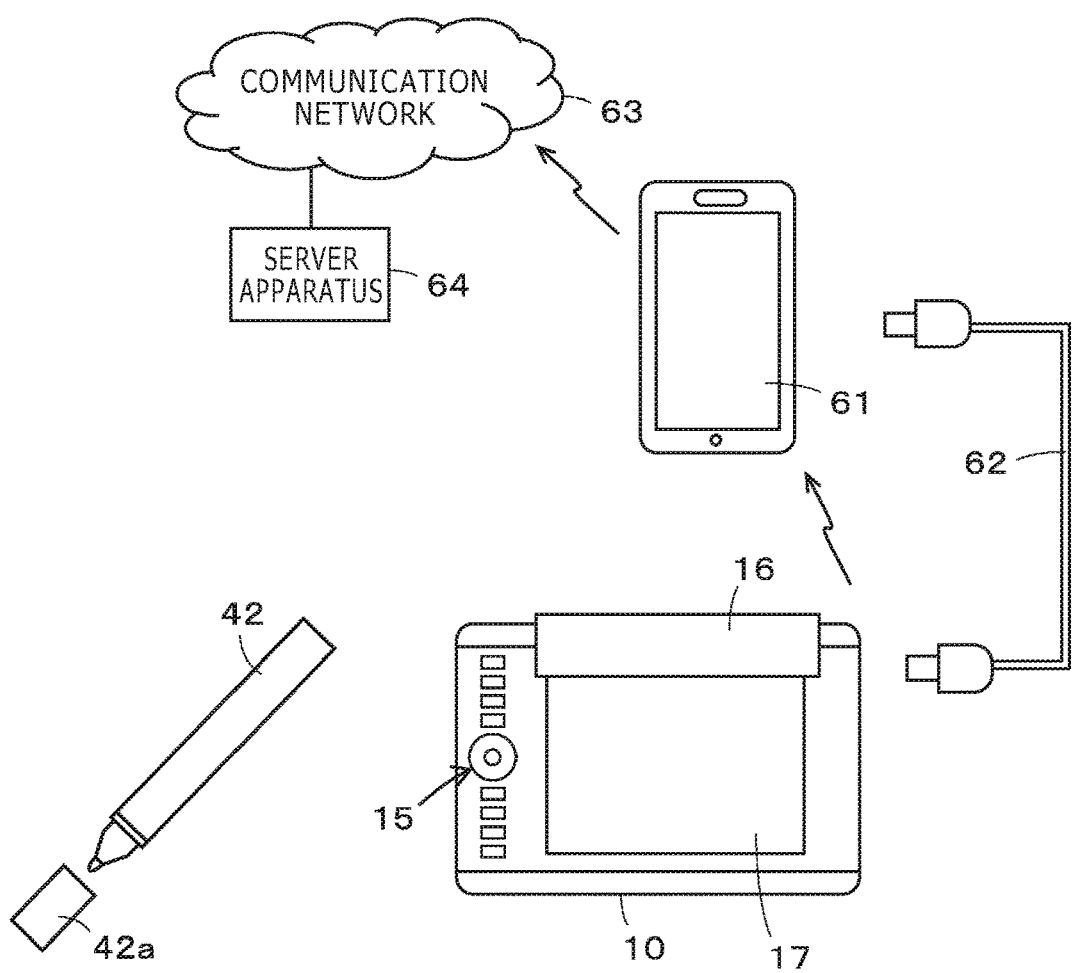
FIG. 15 is a view depicting a further example of the usage form of the embodiment of the hand-written information processing apparatus according to the present invention.

FIG. 15 depicts an example of a third usage form of the hand-written information processing apparatus 10, and this example of a further usage form of a form in which the hand-written information processing apparatus 10 is carried to and used in the outside such as, for example, an open-air without being connected to an external apparatus.

In the example of the usage form of FIG. 15, although the hand-written information processing apparatus 10 is carried to and used in the outside such as, for example, an open-air in a similar manner as in the example of the usage form of FIG. 14, the hand-written information processing apparatus 10 is not used singly different from the usage form of FIG.

14, but a high function mobile phone terminal 61 called smartphone as an example of an external apparatus is connected to the hand-written information processing apparatus 10 as depicted in FIG. 15. Also in this case, the hand-written information processing apparatus 10 and the high function mobile phone terminal 61 can be connected to each other by a USB cable 62 and can be connected also by wireless communication. It is to be noted that an application program for processing an output signal of the hand-written information processing apparatus 10 is installed in advance in the high function mobile phone terminal 61 similarly as in the personal computer 50 that is an example of the usage form of FIG. 13.

In the example of the usage form of FIG. 15, the hand-written information processing apparatus 10 is used in the live paper mode. The hand-written information processing apparatus 10 stores writing information and stylus additional information of the output signal format in the paper mode into the built-in memory 36 and transmits the writing information and the stylus additional information to the high function mobile phone terminal 61 through the USB cable 62 or by wireless communication. On the high function mobile phone terminal 61, a display image based on the writing information in the live paper mode is displayed on the display screen.

Also in the example of the usage form of FIG. 15, similarly as in the example of FIG. 13, by moving the normal stylus to the proximity of the inputting face of the detection region DA of the hand-written information processing apparatus 10, the hand-written information processing apparatus 10 is placed into the tablet mode. Consequently, the writing information and the stylus additional information in the paper mode stored in the memory 36 are transferred to the high function mobile phone terminal 61, by which a writing process in the tablet mode can be performed.

In this case, although information of a rendered image produced in the tablet mode and displayed on the display screen of the high function mobile phone terminal 61 may be retained into the memory built in the high function mobile phone terminal 61, also it is possible to store the information into a predetermined server apparatus 64 through a communication network 63. In short, it is possible to store a rendered image into the storage unit of the crowd.

It is to be noted that, while, in the embodiment described above, writing information and stylus additional information are stored in the built-in memory 36 also in the live paper mode, the application program may be configured such that writing information and stylus additional information in the live paper mode are stored into the storage unit of an external apparatus such that, when the tablet mode is entered, the stored information is treated as writing information in the tablet mode. In this case, in the live paper mode, there is no necessity for the memory 36 to store the writing information and the stylus additional information in advance.

For example, in the example of the usage form of FIG. 13, writing information and stylus additional information in the live paper mode of the hand-written information processing apparatus 10 are stored in advance into the storage unit of the personal computer 50. Thus, the hand-written information processing apparatus 10 may be configured such that, if the tablet mode is entered, then the hand-written information processing apparatus 10 acquires the writing information and the stylus additional information in the live paper mode stored in the storage unit of the personal computer 50 and stores the acquired information into the built-in memory 36 of the hand-written information processing apparatus 10 and then transmits the information as information in the tablet mode to the personal computer 50 again. Alternatively, the hand-written information processing apparatus 10 may be configured such that, if the tablet mode is entered, then the writing information and stylus additional information in the live paper mode stored in the storage unit of the personal computer 50 is used as information for the tablet mode of the hand-written information processing apparatus 10 such that it is treated as information of a design in the tablet mode.

It is to be noted that, in the case of the usage form of FIG. 15, the built-in memory of the personal computer 50 in the example of the usage form of FIG. 13 described hereinabove may be configured as a built-in memory of the high function mobile phone terminal 61 or as a storage unit of the server apparatus 64 such that writing information and stylus additional information in the live paper mode stored in the built-in memory of the high function mobile phone terminal 61 or the storage unit of the predetermined server apparatus 64 are used as information for the tablet mode of the hand-written information processing apparatus 10 and treated as information of a design in the tablet mode.

Other Embodiments or Other Modifications

It is to be noted that, in the embodiment described above, the stylus recognition circuit 103 decides which stylus is used by recognizing whether the stylus is the stylus ID of the normal stylus or the stylus ID of the ink stylus. However, since the embodiment described above assumes that two different styluses are used, the stylus recognition circuit 103 may be configured such that it has a function capable of recognizing only one of the stylus ID of the normal stylus and the stylus ID of the ink stylus. In particular, for example, if the stylus recognition circuit 103 has only a function for recognizing the stylus ID of the normal stylus, then when this stylus ID is recognized, the stylus recognition circuit 103 changes over the hand-written information processing apparatus 10 to the tablet mode, but when the stylus recognition circuit 103 decides that the stylus ID is any other than the normal stylus ID, the stylus recognition circuit 103 can change over the hand-written information processing apparatus 10 to the paper mode.

Further, while, in the embodiment described above, the clip member 16 is used to fix the paper sheet 17 against movement on the inputting face of the hand-written information processing apparatus 10, the method for fixing the paper sheet 17 against movement on the inputting face is not limited to the method which uses the clip member 16. FIG. 16 depicts an example of a different configuration example for fixing the paper sheet 17 against movement on the inputting face of the hand-written information processing apparatus 10, and in this example, a cover member is mounted on a main body portion of the hand-written information processing apparatus 10.

Figure 16A:
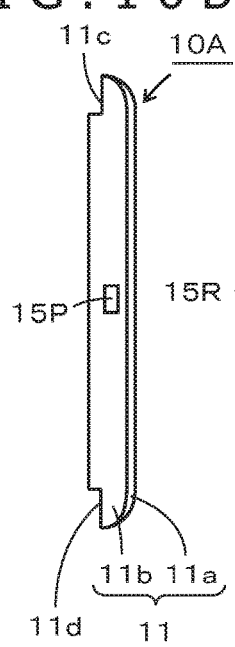
FIGS. 16A-16D illustrate a modification to the embodiment of the hand-written information processing apparatus according to the present invention.
Figure 16B:
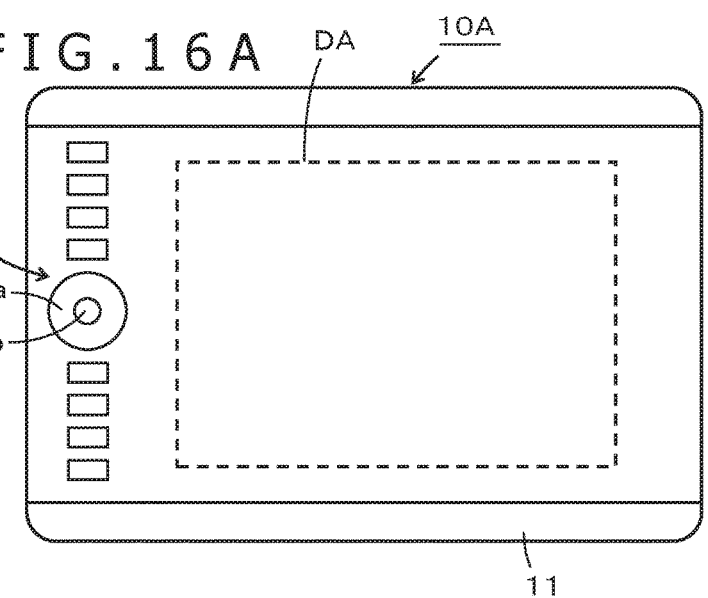

Although the appearance when a hand-written information processing apparatus 10A of the present example is viewed from its inputting face side is, as depicted in FIG. 16A, similar to that of FIG. 1A, the configuration of the rear side thereof is different a little. In particular, as depicted in FIG. 16B which is a side elevational view of the hand-written information processing apparatus 10A of the present example, stepped portions 11c and 11d are formed at an upper end and a lower end of the rear side which is the opposite side to the inputting face, respectively.

Figure 16C:
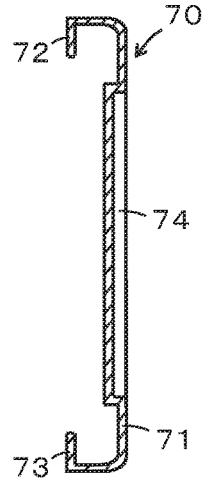
Figure 16D:
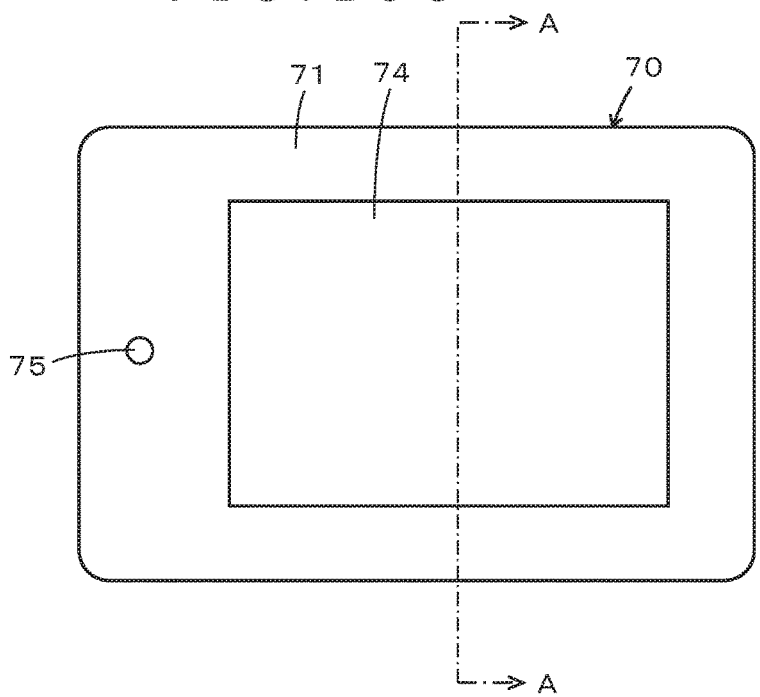

Further, a cover member 70 depicted in FIGS. 16C and 16D is attached to the hand-written information processing apparatus 10A of the present example. FIG. 16C is a view of the cover member 70 as viewed from the front, and FIG.

16D is a sectional view taken along line A-A of FIG. 16C. The cover member 70 includes a face 71 which covers the overall area of the inputting face of hand-written information processing apparatus 10A as depicted in FIG. 16C, and has engaging portions 72 and 73 formed at an stepped portion and a lower end portion of the face 71 thereof so as to engage with the stepped portions 11c and 11d of the hand-written information processing apparatus 10A as depicted in FIG. 16D, respectively.

The cover member 70 is mounted on the main body of the hand-written information processing apparatus 10A by slidably moving the cover member 70 from a horizontal direction in such a state that engaging portions 72 and 73 are engaged with the stepped portions 11c and 11d, respectively.

Further, a recessed portion 74 for accommodating a paper sheet 17 therein is formed on the face 71 of the cover member 70 in a region overlapping with the detection region DA when the cover member 70 is mounted so as to cover the inputting face of the hand-written information processing apparatus 10A. The paper sheet 17 has a size according to the recessed portion 74 and, when it is accommodated in the recessed portion 74, it is fixed so as not to move on the inputting face.

In the example of FIG. 16, the face 71 of the cover member 70 is configured in such a manner as to cover an operation portion of an operation button which is not used in the paper mode in the operation button group 15. In particular, as depicted in FIG. 16A, the face 71 of the cover member 70 is configured such that it has a perforation 75 formed therein for exposing a depression operation portion 15Rb of the operation button 15R therethrough and covers all of the operation portions of the other operation buttons of the operation button group 15.

Accordingly, in the present example, in the paper mode, where the cover member 70 is mounted on the hand-written information processing apparatus 10A, the operation portions to be invalidated in the operation button group 15 are covered with the cover member 70 so as to be disabled for operation. Consequently, different from an operation invalidation process by signal processing, operation invalidation by a mechanical method for the operation button group 15 in the paper mode is implemented.

It is to be noted that, although an operation of operation buttons for performing image operation processing such as to vary the display image of writing information in the operation button group 15 is invalidated except a page feeding operation for exchanging the paper sheet 17 and a changeover operation between the standard paper mode and the live paper mode in the paper mode, limitation of an operation by an operation button includes a case in which only part of operations are invalidated and another case in which all operations by the operation button are invalidated. Alternatively, while all operations by the operation buttons are inhibited, only a predetermined touch operation with the touch detection sensor 13 may be validated.

Further, setting of the paper mode may be performed also by detecting whether or not the clip member 16 is mounted on the housing 11 of the hand-written information processing apparatus 10A or whether or not the cover member 70 is mounted on the hand-written information processing apparatus 10A.

Figure 17:
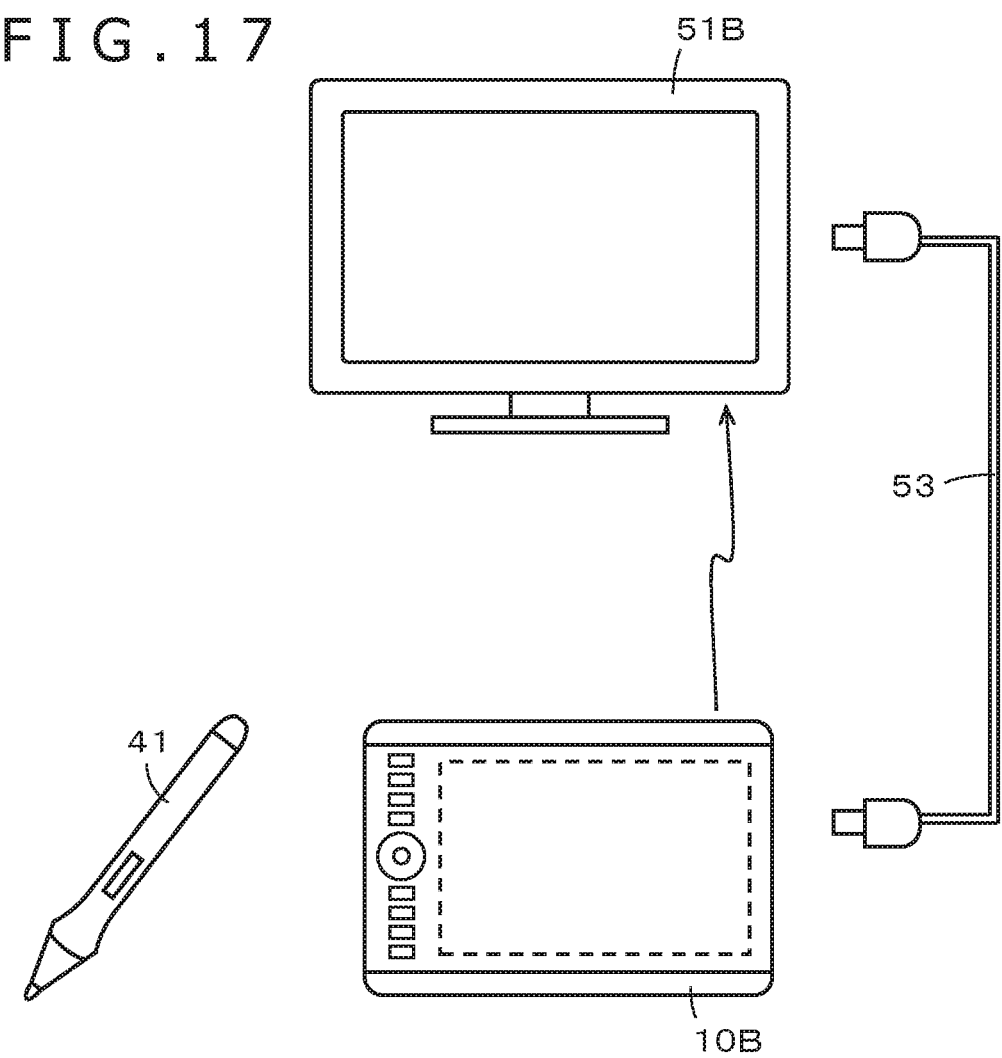
FIG. 17 is a view depicting an example of a system configuration of a different embodiment of the hand-written information processing apparatus according to the present invention.

Further, in the embodiment described above, the hand-written information processing apparatus 10A does not have a generation processing function of a display image based on writing information and an external apparatus is configured such that it performs a generation process of a display image based on writing information. However, the hand-written information processing apparatus 10A may be configured such that it has a generation processing function of a display image based on writing information. A hand-written information processing apparatus 10B in this case is connected to a display apparatus 51B by the USB cable 53 or by wireless communication as depicted in FIG. 17 to transmit a generated display image to the display apparatus 51B.

Furthermore, the hand-written information processing apparatus of the present invention may have, as a configuration including also a display screen, a configuration of a standalone apparatus without connecting to an external apparatus. In this case, as depicted in FIG. 18, a display apparatus 18 configured, for example, from an LCD (Liquid Crystal Display) is provided in an overlapping relationship with the detection region DA between the touch detection sensor 13 and the stylus detection sensor 12.

Further, in the embodiment described hereinabove, as an example of the operation inputting unit for display image processing, a touch detection sensor for detecting a finger touch operation is used, and this touch detection sensor is configured as a sensor separate from the stylus detection sensor. However, it is possible to form the stylus detection sensor from a sensor of the capacitive type such that the sensor of the capacitive type is used time-divisionally to perform finger touch detection and stylus detection thereby to form the touch detection sensor and the stylus detection sensor from a single sensor.

Figure 19:
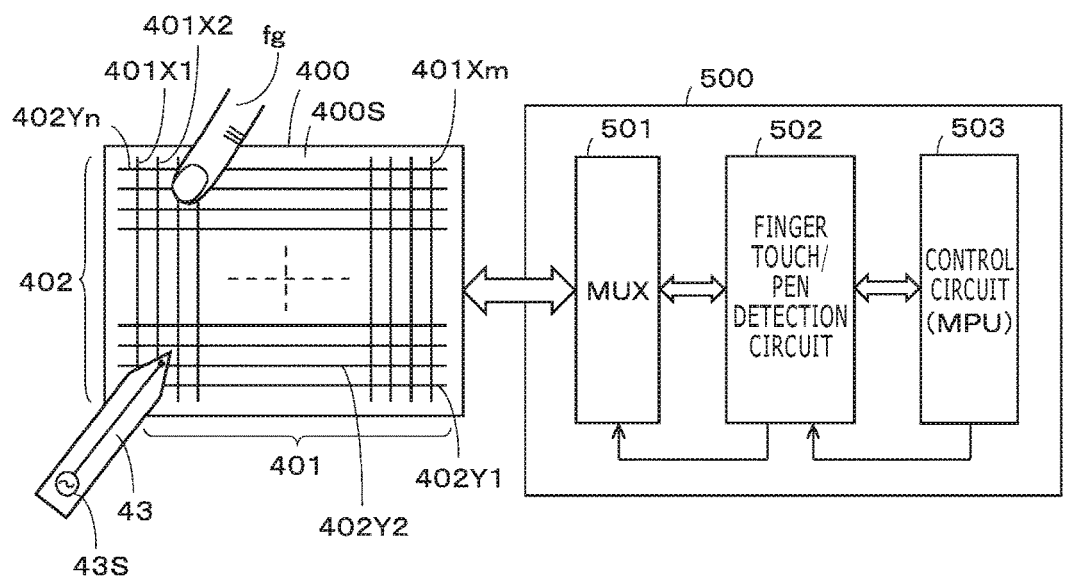
FIG. 19 is a view illustrating an example of a configuration of the different embodiment of the hand-written information processing apparatus according to the present invention.

FIG. 19 is a view depicting a general configuration of a sensor of a capacitive type and a position detection circuit for the sensor.

In the case of the present embodiment, this is configured from a position detection sensor 400 and a position detection circuit 500 as depicted in FIG. 19. The position detection sensor 400 has a grid configuration in which an X conductor group 401 and a Y conductor group 402 cross in orthogonal directions to each other similarly as in the touch detection sensor 13. The Y conductor group 402 includes a plurality of Y conductors 402Y1, 402Y2, . . . , 402Yn (n is an integer equal to or greater than 1) extending in a horizontal direction (X-axis direction) and disposed in parallel in a predetermined spaced relationship from each other. Further, the X conductor group 401 includes a plurality of X conductors 401X1, 401X2, . . . , 401Xm (m is an integer equal to or greater than 1) extending in a longitudinal direction (Y-axis direction) crossing with, in the present example, orthogonal to, the Y conductors 402Y1, 402Y2, . . . , 402Yn and disposed in parallel in a predetermined spaced relationship from each other.

The position detection sensor 400 is configured such that a sensor pattern formed from the X conductors and the Y conductors crossing with each other is used to detect a position indicated by a finger fg or a stylus 43 of the active capacitive type. The stylus 43 of the active capacitive type includes a signal generation circuit 43S and has a configuration for transmitting a signal from the signal generation circuit 43S to the position detection sensor 400. It is to be noted that, also in the present example, as the stylus 43, a normal stylus and an ink stylus are prepared similarly as in the embodiment described hereinabove.

Figure 20:
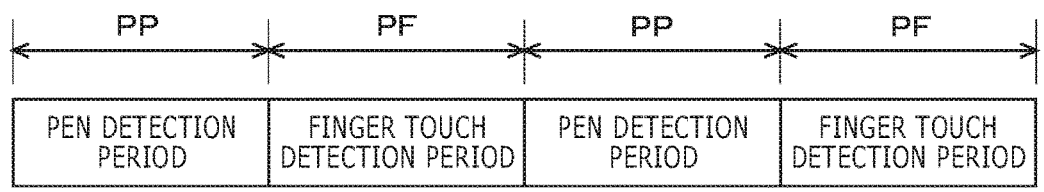
FIG. 20 is a view illustrating an example of a configuration of the different embodiment of the hand-written information processing apparatus according to the present invention.

The position detection circuit 500 is configured from a multiplexer 501 serving as an input/output interface with the position detection sensor 400, a finger touch/pen detection circuit 502 and a control circuit 503. The control circuit 503 controls action of the entire position detection circuit 500 and is configured, in the present example, an MPU (microprocessor unit). The position detection circuit 500 in the present embodiment is controlled such that it time-divisionally performs detection of a finger touch and detection of a pen touch by the stylus 43 or the like. In particular, the position detection circuit 500 time-divisionally executes a pen detection period PP within which detection of a pen touch is to be executed and a finger touch detection period PF within which detection of a finger touch is executed as depicted in FIG. 20. The control circuit 503 switchably controls the multiplexer 501 and the finger touch/pen detection circuit 502 within the finger touch detection period PF and within the pen detection period PP.

Within the finger touch detection period, since the capacitance at each of cross points of the sensor pattern of the position detection sensor 400 of the grid configuration formed from the X conductors and the Y conductors crossing with each other varies at a position at which the finger fg touches, the position detection circuit 500 detects the variation of the capacitance to detect the position of the finger touch.

On the other hand, within the pen detection period PP, the position detection sensor 400 detects a signal sent out from the stylus 43 and outputs the signal to the position detection circuit 500. The position detection circuit 500 measures, for each of the conductors configuring the X conductor group 401 and the Y conductor group 402, the level of the signal sent out from the stylus 43 to specify the X conductor and the Y conductor whose reception signal indicates a high level thereby to detect the indication position in the detection region DA of the position detection sensor 400. Further, the position detection circuit 500 detects writing pressure information or a stylus ID sent out from the stylus 43.

According to the configuration depicted in FIGS. 19 and 20, there is an advantageous effect that, since only one sensor configures the hand-written information processing apparatus, the configuration is further simplified.

Description of Example of Detailed Configuration of Clip Member Mounted on Hand-Written Information Processing Apparatus An example of a more detailed configuration of the clip member is further described including a relationship with a size or the like of the hand-written information processing apparatus on which the clip member is mounted.

Figures 21A, 21B:
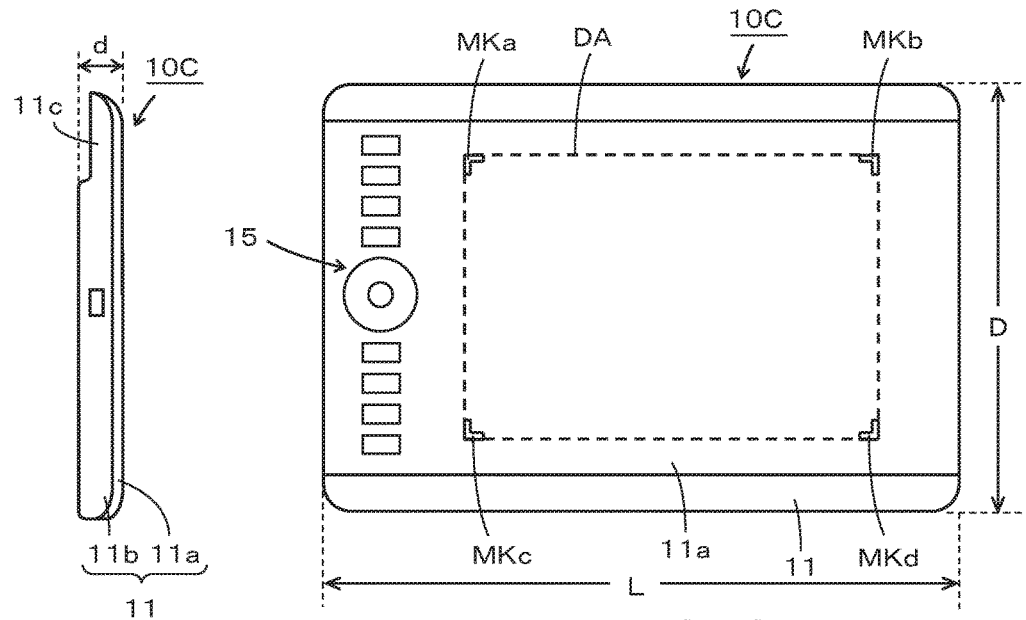
FIGS. 21A and 21B each is a view illustrating an outline of another different embodiment of the hand-written information processing apparatus according to the present invention.

FIG. 21 is a view depicting an appearance of a hand-written information processing apparatus 10C on which a clip member is mounted, and FIG. 21A is a front elevational view and FIG. 21B is a left side elevational view of the hand-written information processing apparatus 10C. Same elements to those of the hand-written information processing apparatus 10 described above are denoted by same reference characters. The hand-written information processing apparatus 10C is configured such that a housing 11 has a shape like a thin plate similarly to the hand-written information processing apparatuses 10, 10A and 10B described hereinabove.

In the present example, the length L of the housing 11 in the long side direction (horizontal direction) is, for example, L=34 cm, and the length D of the short side (depthwise direction) of the housing 11 is, for example, D=22 cm. Further, the thickness d of the housing 11 is, for example, d=10 mm.

The housing 11 of the hand-written information processing apparatus 10C is configured from an upper side case 11a and a lower side case 11b as depicted in FIG. 21B and is configured such that the upper side case 11a is fitted on the lower side case 11b in a state in which the upper side case 11a covers an internal space of the lower side case 11b.

Similarly as in the foregoing description, a rectangular region, surrounded by a broken line in FIG. 21A, of the surface of the upper side case 11a of the hand-written information processing apparatus 10C of the present example, forms a detection region DA common to a stylus detection sensor and a touch detection sensor. Further, in the hand-written information processing apparatus 10C of the present example, marks MKa, MKb, MKc and MKd indicative of positions of the four corners of the rectangular detection region DA are formed on the surface of the upper side case 11a, for example, by printing.

It is to be noted that the marks MKa, MKb, MKc and MKd indicative of the positions of the four corners of the rectangular detection region DA may not be formed by printing but be formed each from an LED (Light Emitting Diode).

Figures 22A, 22B:
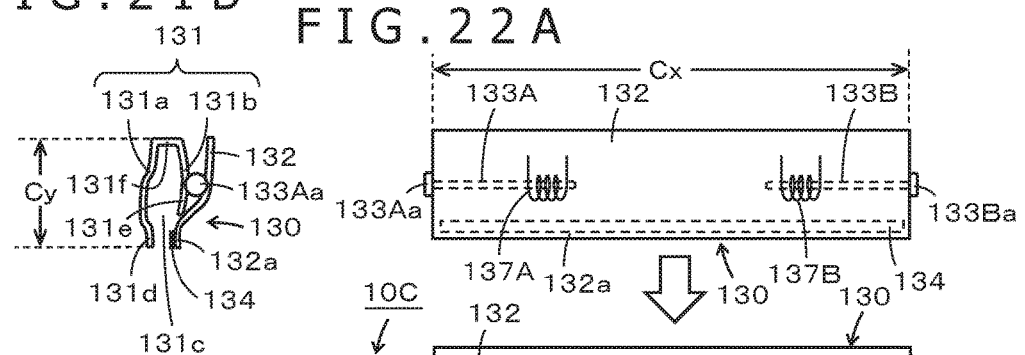
FIGS. 22A-22C each is a view illustrating an outline of a further different embodiment of the hand-written information processing apparatus according to the present invention.
Figure 22C:
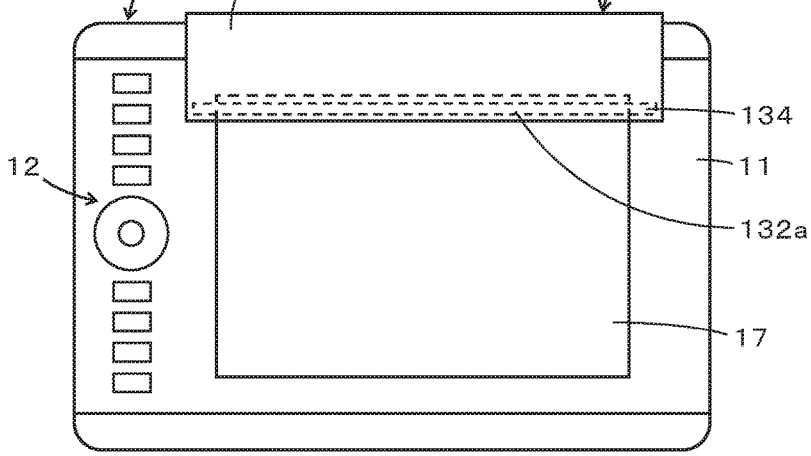

FIG. 22 is a view depicting an example of a configuration of a clip member 130 mounted on the hand-written information processing apparatus 10C of the present example. In particular, FIG. 22A is a front elevational view of the clip member 130, and FIG. 22B is a left side elevational view of the clip member 130. Further, FIG. 22C illustrates a state in which the clip member 130 is attached to the housing 11 of the hand-written information processing apparatus 10C to elastically fix paper sheet 17. In the present example, as depicted in FIG. 22C, the clip member 130 is mounted at an stepped portion 11c of the housing 11 of the hand-written information processing apparatus 10C.

The length Cx of the clip member 130 in its longitudinal direction (direction crossing with the attachment direction of the clip member 130 to the hand-written information processing apparatus 10C) is smaller than the length of the hand-written information processing apparatus 10C in the horizontal direction and is greater than the length of the detection region DA in the horizontal direction, and in the present example, Cx=23.5 cm. It is to be noted that the size of the paper sheet 17 is equal to or a little greater than the size of the detection region DA. Further, the length Cx of the clip member 130 in the longitudinal direction is greater than the length of the detection region DA in the horizontal direction and besides is greater than the length of the paper sheet 17 in the horizontal direction.

Further, the length Cy of the clip member 130 in the depthwise direction (attachment direction of the clip member 130 to the hand-written information processing apparatus 10C) is set to a length by which the clip member 130 can reliably fix the paper sheet 17 placed so as to cover the detection region DA, and in the present example, Cy=4 cm. It is to be noted that, while the length Cx of the clip member 130 in the longitudinal direction is selected, in the example of FIG. 22C, so as to be greater than the length of the paper sheet 17 in the longitudinal direction, it may be a length smaller than the length of the paper sheet 17 in the longitudinal direction.

The clip member 130 of the present example is configured from an attaching portion 131 which configures an example of a first member and a holding down piece 132 which configures an example of a second member as depicted in FIG. 22B.

The attaching portion 131 has a first face portion 131b and a second face portion 131a opposing to each other and each having a curved shape and has a recessed portion 131c having a channel-shaped (U-shaped) cross section formed by connecting the first face portion 131b and the second face portion 131a to each other on one end side thereof by a connecting portion 131f with an opening formed at the other end side thereof. As depicted in FIG. 22B, while the length of the second face portion 131a in the depthwise direction of the clip member 130 is set equal to the length Cy described above, the length of the first face portion 131b in the depthwise direction is set to a length smaller than the length Cy.

The holding down piece 132 is configured from a plate-like member having a cross section of a curved shape and curved a little and is attached to the second face portion 131a of the attaching portion 131 for pivotal motion around the center of pivotal motion provided by pivot shafts 133A and 133B formed from two bar-like members disposed in the longitudinal direction of the clip member 130 (direction orthogonal to the attachment direction to the hand-written information processing apparatus 10C). Around the pivot shafts 133A and 133B, coil springs 137A and 137B as an example of biasing members are wound, and an end portion 132a of the holding down piece 132 on the opening side of the recessed portion 131c of the attaching portion 131 is configured such that it is normally biased elastically to the attaching portion 131 side by the coil springs 137A and 137B.

In the present example, the length of the holding down piece 132 in the depthwise direction (attachment direction of the clip member 130 to the hand-written information processing apparatus 10) when the holding down piece 132 is coupled to the attaching portion 131 is set substantially equal to the length Cy. An end portion of the holding down piece 132 on the connecting portion 131f side between the first face portion 131b and the second face portion 131a of the attaching portion 131 is positioned at the same position as that of an end face (outer face) of the connecting portion 131f or positioned on the inner side of the hand-written information processing apparatus 10 with respect to the end face (outer face) of the connecting portion 131f.

Further, since the length in the depthwise direction of the first face portion 131b of the attaching portion 131 is smaller than the length Cy, the end portion 132a of the holding down piece 132 is an extension extending farther than an end portion 131e on the opening side of the first face portion 131b of the attaching portion 131.

Further, the end portion 132a of the holding down piece 132 is in a state in which it opposes to an end portion 131d side of the second face portion 131a of the attaching portion 131 as depicted in FIG. 22B. In particular, the end portion 132a of the holding down piece 132 is configured such that it is elastically biased by the coil springs 137A and 137B in a state in which it is opposed to the end portion 131d side of the second face portion 131a of the attaching portion 131.

At the portion of the end portion 132a of the holding down piece 132 opposing to the end portion 131d of the second face portion 131a of the attaching portion 131, in the present example, a non-slip member 134 (refer to broken lines of FIGS. 22A and 22C) formed from a rubber member, for example, a rubber member, is provided.

Figure 23:
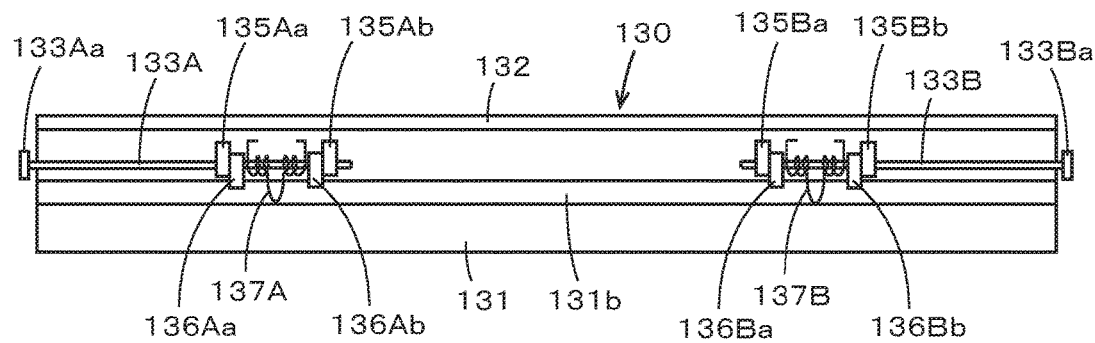
FIG. 23 is a view illustrating an example of a configuration of a clip member in the example of FIGS. 22A-22C.

FIG. 23 is a view of the clip member 130 as viewed from the opposite side to the end portion 132a side of the holding down piece 132. On the opposing face side of the first face portion 131b of the attaching portion 131 to the holding down piece 132, two projections 136Aa and 136Ab having through-holes (not depicted) through which a pivot shaft 133A extends are provided and two projections 136Ba and 136Bb having through-holes (not depicted) through which a pivot shaft 133B extends are provided. On the other hand, on the opposing face side of the holding down piece 132 to the first face portion 131b of the attaching portion 131, two projections 135Aa and 135Ab having through-holes (not depicted) through which the pivot shaft 133A extends and two projections 135Ba and 135Bb having through-holes (not depicted) through which the pivot shaft 133B extends are provided.

The pivot shaft 133A formed from a bar-like member is attaches so as to extend through the four projections 135Aa and 135Ab, 136Aa and 136Ab and the pivot shaft 133B formed from a bar-like member extends through the four projections 135Ba and 135Bb, 136Ba and 136Bb to couple the attaching portion 131 and the holding down piece 132 to each other.

As depicted in FIG. 23, a coil spring 137A is fitted around the pivot shaft 133A between the two projections 136Aa and 136Ab of the second face portion 131a of the attaching portion 131 and a coil spring 137B is fitted around the pivot shaft 133B between the two projections 136Ba and 136Bb. By the coil springs 137A and 137B, the end portion 132a side of the opening side of the holding down piece 132 is normally displaced elastically to the first face portion 131b side of the attaching portion 131. It is to be noted that one end 133Aa of the pivot shaft 133A on the end portion side in the horizontal direction of the clip member 130 is configured such that it has a disk-like shape of a diameter greater than the diameter of the pivot shaft 133A. Similarly, also another end 133Ba of the pivot shaft 133B on the end portion side in the horizontal direction of the clip member 130 is configured such that it has a disk-like shape of a diameter greater than the diameter of the pivot shaft 133B.

Figure 24A:
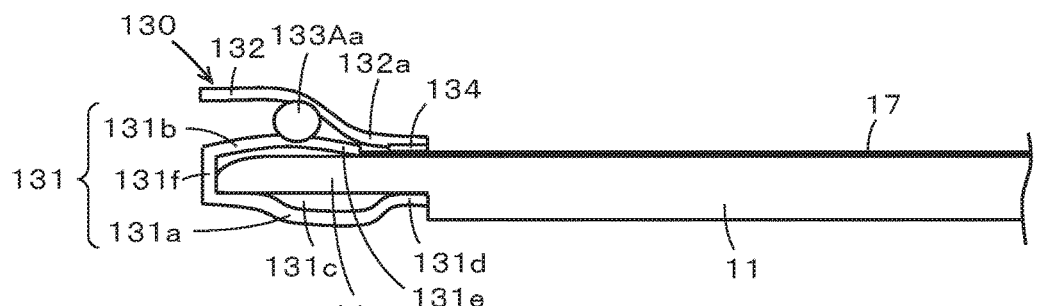
FIGS. 24A-24C illustrate an example of a configuration of the clip member in the example of FIGS. 22A-22C.

The attaching portion 131 of the clip member 130 is configured from a material having elasticity, for example, from a resin, and the recessed portion 131c is formed in accordance with the shape and the size of the stepped portion 11c of the housing 11. As depicted in FIG. 24A, the clip member 130 is attached to the stepped portion 11c of the housing 11 of the hand-written information processing apparatus 10C in such a manner that the stepped portion 11c of the housing 11 of the hand-written information processing apparatus 10C is accommodated in the recessed portion 131c of the attaching portion 131. The width of the recessed portion 131c of the attaching portion 131 of the clip member 130 is formed a little smaller than the thickness of the stepped portion 11c of the housing 11, and the clip member 130 is locked (fixed) to the stepped portion 11c of the housing 11 of the hand-written information processing apparatus 10C by the elastic force of the attaching portion 131 in such a manner that the stepped portion 11c of the housing 11 is held by the recessed portion 131c. However, the clip member 130 can be removed from the hand-written information processing apparatus 10C by removing the attaching portion 131 thereof from the stepped portion 11c of the housing 11.

In a state in which the clip member 130 is fixed to an stepped portion of the housing 11 of the hand-written information processing apparatus 10C as depicted in FIGS. 22C and 24A, the end portion 132a of the holding down piece 132 of the clip member 130 is in a state in which it elastically presses the surface of the upper side case 11a of the housing 11 as depicted in FIG. 24A. If, in this state, the opposite side of the holding down piece 132 to the end portion 132a is pushed down, then the holding down piece 132 can be pivoted around the pivot shaft 133 to provide a gap between the end portion 132a of the holding down piece 132 and the surface of the upper side case 11a of the housing 11. However, if the pushing down of the opposite side of the holding down piece 132 to the end portion 132a is canceled, then the state in which the end portion 132a of the holding down piece 132 elastically pushes the surface of the upper side case 11a of the housing 11 is restored.

Accordingly, if, in the state in which the clip member 130 is attached to the housing 11 as depicted in FIGS. 22C and 24A, the opposite side of the holding down piece 132 to the end portion 132a is pushed down to provide a gap between the end portion 132a of the holding down piece 132 and the surface of the upper side case 11a of the housing 11 and an upper end of a paper sheet 17 is placed into the gap and then the pushing down of the opposite side of the holding down piece 132 to the end portion 132a is canceled, then the paper sheet 17 is sandwiched elastically between the end portion 132a of the holding down piece 132 and the surface of the upper side case 11a of the housing 11 such that the paper sheet 17 is fixed in position so as not to move.

Thereupon, if the paper sheet 17 is mounted on the surface of the upper side case 11a of the housing 11 and is moved in the depthwise direction, then the upper end of the paper sheet 17 is abutted with and positioned by an end face of the end portion 131e of the first face portion 131b of the attaching portion 131 of the clip member 130 as depicted in FIG. 24A.

Further, in the present example, especially by the non-slip member 134 provided at the end portion 132a of the holding down piece 132, the paper sheet 17 is elastically pressed more strongly against the surface side of the upper side case 11a of the housing 11 such that it is fixed in position so as not to move.

Figure 24B:
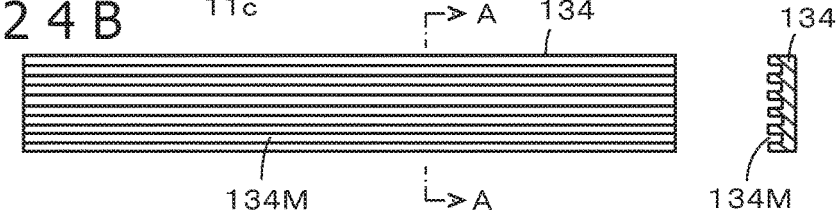
Figure 24C:

The non-slip member 134 is, in the present example, formed from a rubber member, and on the non-slip member 134, one or a plurality of grooves 134M are formed in a direction crossing with the attachment direction of the clip member 130 to the hand-written information processing apparatus 10C as depicted in FIG. 24B and FIG. 24C which is a sectional view taken along line A-A of FIG. 24B. The non-slip effect for the paper sheet 17 is enhanced by the one or plurality of grooves 134M.

It is to be noted that the paper sheet 17 fixed in position by the clip member 130 may be one sheet or a plurality of sheets.

It is to be noted that, while the clip member 130 in the embodiment described above is mounted on the stepped portion 11c of the housing 11 of the hand-written information processing apparatus 10C, it may be mounted at a lower end portion of the housing 11. In the case of the hand-written information processing apparatus 10C of the present embodiment, the distance from the upper end position of the detection region DA to the upper end position of the housing 11 and the distance from the lower end position of the detection region DA to the lower end position of the housing 11 are substantially equal to each other as depicted in FIGS. 21A and 22C, and there is no problem in mounting of the clip member 130 on the lower end portion side of the housing 11.

Further Different Configuration Example of Clip Member

Although, in the embodiment described above, two separate pivot shafts are used, the pivot shaft 133A and the pivot shaft 133B can be configured as a single pivot shaft by connecting them to each other. Further, where the single pivot shaft is used, although two coil springs may be used as in the embodiment described above, a single coil spring may be used as a biasing member.

Figure 25:
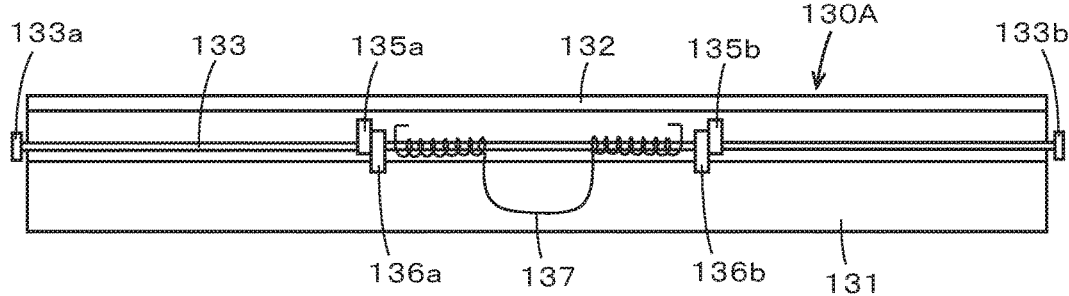
FIG. 25 is a view illustrating a different example of the clip member mounted on the hand-written information processing apparatus according to the present invention.

FIG. 25 is a view depicting an example of a configuration of essential part of a clip member 130A in which a single coil spring is used as the biasing member. In the clip member 130A, same portions to those of the clip member 130 are denoted by same reference characters to those described above. It is to be noted that FIG. 25 is a view of the clip member 130A as viewed from the opposite side to the end portion 132a side of the holding down piece 132 similarly to FIG. 23.

The clip member 130A of the present example uses a pivot shaft 133 formed from a single bar-like member. An end portion 133a and the other end portion 133b of the pivot shaft 133 are formed in a disk-like shape of a diameter greater than the diameter of the pivot shaft 133.

Further, in the example of the clip member 130A, two projections 136a and 136b having through-holes (not depicted) through which the pivot shaft 133 extends are provided on an opposing face side of the first face portion 131b of the attaching portion 131 to the holding down piece 132. Meanwhile, two projections 135a and 135b having through-holes (not depicted) through which the pivot shaft 133 extends are provided on an opposing face side of the holding down piece 132 to the first face portion 131b of the attaching portion 131.

The pivot shaft 133 formed from a bar-like member is attached so as to extend through the four projections 135a and 135b, 136a and 136b to couple the attaching portion 131 and the holding down piece 132 to each other.

Further, as depicted in FIG. 25, a coil spring 137 is fitted and provided on the pivot shaft 133 between the two projections 136a and 136b of the second face portion 131a of the attaching portion 131. By the coil spring 137, the end portion 132a side of the holding down piece 132 is normally displaced elastically to the first face portion 131b side of the attaching portion 131.

Other Examples of Attachment of Clip Member to Housing

Figure 26:
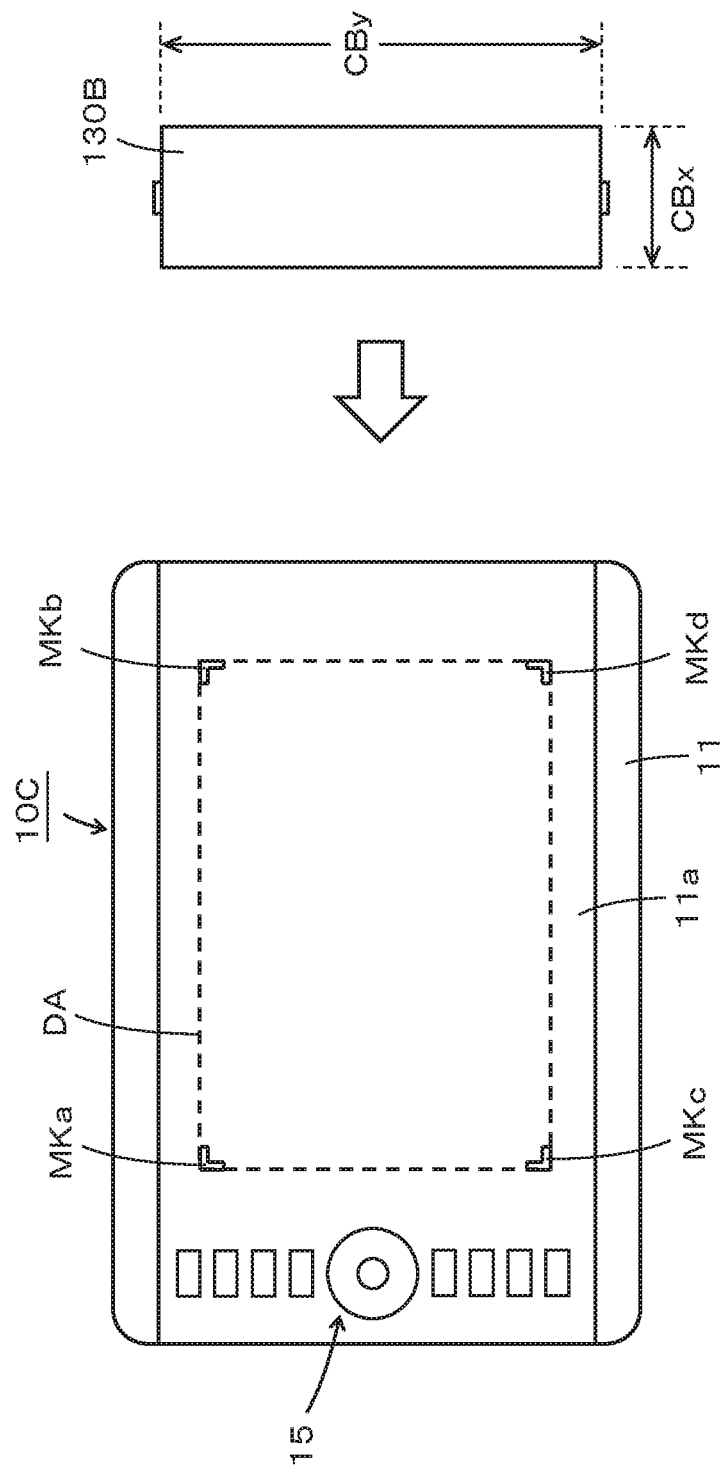
FIG. 26 is a view illustrating a different example of the clip member mounted on the hand-written information processing apparatus according to the present invention.

While, in the embodiment described above, the clip member is removably attached to an stepped portion or a lower end portion of the housing 11 of the hand-written information processing apparatus 10C, also it is possible to configure the clip member such that it is removably attached to a side portion of the right side of the housing 11 as depicted in FIG. 26.

In a clip member 130B in this case, the length CBy thereof in a direction crossing with (in the present example, orthogonal to) the attachment direction of the clip member 130B to the hand-written information processing apparatus 10C is greater than the length in the depthwise direction of the detection region DA of the hand-written information processing apparatus 10C and is equal to the length D (refer to FIG. 21) of the hand-written information processing apparatus 10C in the depthwise direction or smaller than the length D. This is because, since the size of the paper sheet to be placed on the inputting face of the housing 11 of the hand-written information processing apparatus 10 is a size equal to or greater than that of the detection region DA, in order to fix the paper in position with certainty, such a dimensional relationship as described above is preferable. However, if the paper sheet can be fixed in position, then the length CBy of the clip member 130B in the longitudinal direction may naturally be smaller than the length of the detection region DA in the depthwise direction. Further, although the length CBy of the clip member 130B in the longitudinal direction preferably is smaller than the length of the housing 11 in the depthwise direction, it may be longer.

Further the length CBx of the housing 11 of the clip member 130B in the horizontal direction may be a length with which a right end portion of the paper sheet placed on the inputting face of the housing 11 of the hand-written information processing apparatus 10C can be fixed in position with certainty.

Different Embodiment or Modification

In the example described above, each of the clip members 130 and 130B is configured such that it is attached to the stepped portion 11c of the housing 11 of the hand-written information processing apparatus 10C in such a manner that the stepped portion 11c of the housing 11 of the hand-written information processing apparatus 10C is accommodated in the recessed portion 131c of the attaching portion 131 and sandwiches the paper sheet (sheet member) 17 placed on the hand-written information processing apparatus 10C by the end portion 132a of the holding down piece 132 (second member). However, each of the clip members 130 and 130B may be configured such that the paper sheet (sheet portion) 17 is sandwiched by accommodating the hand-written information processing apparatus 10C on which the paper sheet 17 is placed into the recessed portion 131c of the attaching portion 131 together with the paper sheet 17. In this case, the holding down piece (second member) may not necessarily be provided.

While the sheet-like member in the example described above is a paper sheet, any sheet member may be used if, when an ink stylus whose core member has a pen function or a function of a mechanical pencil is used for writing on the sheet member, a writing trace can be formed visually on the sheet member.

What is claimed is:

1. A hand-written information processing apparatus, comprising:
    an inputting surface;
    a stylus detection sensor which, in operation, detects a first writing operation of a first stylus and a second writing operation of a second stylus;
    a stylus recognition circuit which, in operation, recognizes whether a writing operation on the inputting face is the first writing operation by the first stylus configured to generate electronic writing information based on the first writing operation, or the second writing operation by the second stylus configured to generate electronic writing information based on the second writing operation and to form visual representation of the second writing operation on a sheet;
    an operation input interface configured to receive a user's operation in the first writing operation and in the second writing operation; and
    a control circuit which, in operation,
        performs a first control processing in response to the first writing operation by the first stylus, wherein the first control processing includes: i) at least one of image operation processes of enlargement, reduction, rotation, and movement of display image of the electronic writing information in the first writing operation, and ii) invalidation of page number information insertion into the electronic writing information in the second writing operation; and
        performs a second control processing in response to the second writing operation by the second stylus, wherein the second control processing includes: i) the page number information insertion into the electronic writing information in the second writing operation in which a page feeding operation is performed, and ii) invalidation of the at least one of image operation processes of enlargement, reduction, rotation, and movement of display image of the electronic writing information in the first writing operation.

2. The hand-written information processing apparatus according to claim 1, wherein the control circuit enables in the first writing operation the at least one of image operation processes of enlargement, reduction, rotation, and movement of display image of the electronic writing information.

3. The hand-written information processing apparatus according to claim 1, wherein the sheet is placed on the inputting surface.

4. The hand-written information processing apparatus according to claim 1, wherein the sheet is formed of one or more pieces of paper.

5. The hand-written information processing apparatus according to claim 1, wherein at least one of the first stylus and the second stylus is capable of transmitting a stylus identification (ID), and the stylus recognition circuit distinguishes between the first writing operation by the first stylus and the second writing operation by the second stylus based on the stylus ID.

6. The hand-written information processing apparatus according to claim 5, wherein the first stylus and the second stylus are capable of transmitting unique stylus IDs, respectively, and the stylus recognition circuit distinguishes between the first writing operation by the first stylus and the second writing operation by the second stylus based on the unique stylus IDs.

7. The hand-written information processing apparatus according to claim 1, wherein the second stylus is capable of transmitting a stylus identification (ID), the stylus recognition circuit recognizes the second writing operation in response to the stylus ID of the second stylus, and the second stylus includes a stylus core used to form the visual representation of the second writing operation on the sheet.

8. The hand-written information processing apparatus according to claim 1, wherein the stylus detection sensor interacts with the first stylus and the second stylus electromagnetically or capacitively.

9. The hand-written information processing apparatus according to claim 1, wherein the control circuit enables in the second writing operation the page number information insertion into the electronic writing information according to the page feeding operation.

10. The hand-written information processing apparatus according to claim 1, wherein the control circuit operates to include the page number information in the electronic writing information generated in the second writing operation, and operates to not include the page number information in the electronic writing information generated in the first writing operation.

11. The hand-written information processing apparatus according to claim 1, comprising an output interface configured to output the electronic writing information and a memory to store the electronic writing information, wherein
    in the second writing operation, the electronic writing information is selectively output via the memory in which the electronic writing information has been stored.

12. A method of processing hand-written information, comprising:
    detecting a first writing operation of a first stylus and a second writing operation of a second stylus on an inputting surface;
    recognizing whether a writing operation on the inputting face is the first writing operation by the first stylus configured to generate electronic writing information based on the first writing operation, or the second writing operation by the second stylus configured to generate electronic writing information based on the second writing operation and to form visual representation of the second writing operation on a sheet;

receiving a user's operation in the first writing operation and in the second writing operation;

performing a first control processing in response to the first writing operation by the first stylus, wherein the first control processing includes: i) at least one of image operation processes of enlargement, reduction, rotation, and movement of display image of the electronic writing information in the first writing operation, and ii) invalidation of page number information insertion into the electronic writing information in the second writing operation; and performing a second control processing in response to the second writing operation by the second stylus, wherein the second control processing includes: i) the page number information insertion into the electronic writing information in the second writing operation in which a page feeding operation is performed, and ii) invalidation of the at least one of image operation processes of enlargement, reduction, rotation, and movement of display image of the electronic writing information in the first writing operation.

13. The method according to claim 12, wherein at least one of the first stylus and the second stylus is associated with a stylus identification (ID), and the recognizing step distinguishes between the first writing operation by the first stylus and the second writing operation by the second stylus based on the stylus ID.

14. The method according to claim 12, wherein the second stylus is capable of transmitting a stylus identification (ID), the recognizing step includes recognizing the second writing operation based on the stylus ID of the second stylus, and the second stylus includes a stylus core used to form the visual representation of the second writing operation on the sheet.

15. The method according to claim 12, comprising:
including the page number information in the electronic writing information generated in the second writing operation, and
not including the page number information in the electronic writing information generated in the first writing operation.

16. The method according to claim 12, comprising:
storing the electronic writing information in a memory; and
in the second writing operation, selectively outputting the electronic writing information stored in the memory via an output interface.

17. A non-transitory computer readable medium including instructions which, when executed by a computer that controls a hand-written information processing apparatus, performs a process comprising:

detecting a first writing operation of a first stylus and a second writing operation of a second stylus on an inputting surface;

recognizing whether a writing operation on the inputting face is the first writing operation by the first stylus configured to generate electronic writing information based on the first writing operation, or the second writing operation by the second stylus configured to generate electronic writing information based on the second writing operation and to form visual representation of the second writing operation on a sheet;

receiving a user's operation in the first writing operation and in the second writing operation;

performing a first control processing in response to the first writing operation by the first stylus, wherein the first control processing includes: i) at least one of image operation processes of enlargement, reduction, rotation, and movement of display image of the electronic writing information in the first writing operation, and ii) invalidation of page number information insertion into the electronic writing information in the second writing operation; and performing a second control processing in response to the second writing operation by the second stylus, wherein the second control processing includes: i) the page number information insertion into the electronic writing information in the second writing operation in which a page feeding operation is performed, and ii) invalidation of the at least one of image operation processes of enlargement, reduction, rotation, and movement of display image of the electronic writing information in the first writing operation.

18. The non-transitory computer readable medium according to claim 17, wherein the process comprises:
including the page number information in the electronic writing information generated in the second writing operation, and
not including the page number information in the electronic writing information generated in the first writing operation.

19. The non-transitory computer readable medium according to claim 17, wherein the process comprises:
storing the electronic writing information in a memory; and
in the second writing operation, selectively outputting the electronic writing information stored in the memory via an output interface.

* * * * *